United States Patent
Ito et al.

(10) Patent No.: US 12,230,086 B2
(45) Date of Patent: Feb. 18, 2025

(54) INFORMATION PROCESSING SERVER, INFORMATION PROCESSING SYSTEM, DETERMINATION DEVICE, AND METHOD

(71) Applicant: playground Co., Ltd., Tokyo (JP)

(72) Inventors: Keiji Ito, Tokyo (JP); Hiroki Miyanishi, Tokyo (JP)

(73) Assignee: playground Co., Ltd., Tokyo (JP)

( * ) Notice: Subject to any disclaimer, the term of this patent is extended or adjusted under 35 U.S.C. 154(b) by 138 days.

(21) Appl. No.: 17/961,144

(22) Filed: Oct. 6, 2022

(65) Prior Publication Data

US 2023/0030754 A1 Feb. 2, 2023

Related U.S. Application Data

(63) Continuation of application No. PCT/JP2021/015002, filed on Apr. 9, 2021.

(30) Foreign Application Priority Data

Apr. 9, 2020 (JP) ................. 2020-070365

(51) Int. Cl.
*G07C 9/26* (2020.01)
*G06F 21/32* (2013.01)
(Continued)

(52) U.S. Cl.
CPC ............ *G07C 9/26* (2020.01); *G06F 21/32* (2013.01); *G06F 21/33* (2013.01); *G06V 40/171* (2022.01); *G06V 40/172* (2022.01); *G07C 9/27* (2020.01)

(58) Field of Classification Search
CPC .. G07C 9/26; G07C 9/27; G06F 21/32; G06F 21/33; G06V 40/171; G06V 40/172;
(Continued)

(56) References Cited

U.S. PATENT DOCUMENTS 6,185,682 B1 * 2/2001 Tang .................. H04L 9/3247
  713/168
6,202,151 B1 * 3/2001 Musgrave ............. G06Q 20/04
  713/170
(Continued)

FOREIGN PATENT DOCUMENTS

JP 6163239 B1 7/2017

OTHER PUBLICATIONS

International Search Report issued on Jun. 29, 2021 in corresponding International Application No. PCT/JP2021/015002; 4 pages.

*Primary Examiner* — Curtis J King
(74) *Attorney, Agent, or Firm* — Maier & Maier, PLLC

(57) ABSTRACT

An information processing server for managing a ticket, including: a server storage unit storing feature quantity data obtainable from biological information and created in advance, feature quantity identification information associated with the feature quantity data, and prescribed data that is identical to prescribed data stored in a determination device for determining a usage validity of a ticket; and a server control unit determining an item of feature quantity data from a piece of biological information on a user who is to use a ticket, determine a piece of feature quantity identification information based on a comparison between the determined item of feature quantity data and items of feature quantity data stored in the server storage unit, generate a code to be attached to the ticket based on an assigned piece of ticket identification information, the determined piece of feature quantity identification information, and the prescribed data, and generate ticket data.

6 Claims, 11 Drawing Sheets

(51) Int. Cl.
  *G06F 21/33* (2013.01)
  *G06V 40/16* (2022.01)
  *G07C 9/27* (2020.01)
(58) Field of Classification Search
  CPC ...... G06V 40/40; G06Q 20/12; G06Q 20/401;
       G06Q 20/4014; G06Q 30/0601; G06Q
       10/02; H04L 63/0421; H04L 63/0861;
                                   G07F 17/42
  See application file for complete search history.

(56) References Cited

U.S. PATENT DOCUMENTS

| | | | | |
|---|---|---|---|---|
| 6,310,966 | B1* | 10/2001 | Dulude | G06Q 20/04 |
| | | | | 382/116 |
| 6,513,118 | B1* | 1/2003 | Iwamura | H04N 1/32272 |
| | | | | 705/75 |
| 7,035,428 | B1* | 4/2006 | Smith | G06V 10/768 |
| | | | | 382/101 |
| 7,251,347 | B2* | 7/2007 | Smith | G07D 7/12 |
| | | | | 340/5.8 |
| 11,144,922 | B2* | 10/2021 | Sung | H04W 12/72 |
| 11,531,737 | B1* | 12/2022 | Boyd | G06F 16/2455 |
| 11,785,004 | B2* | 10/2023 | Soon-Shiong | G16B 50/00 |
| 2002/0144128 | A1* | 10/2002 | Rahman | H04L 9/3228 |
| | | | | 713/186 |
| 2006/0046842 | A1 | 3/2006 | Mattice et al. | |
| 2007/0022021 | A1* | 1/2007 | Walker | G06Q 10/02 |
| | | | | 705/26.8 |
| 2007/0118758 | A1* | 5/2007 | Takahashi | G06F 21/305 |
| | | | | 713/186 |
| 2007/0192601 | A1* | 8/2007 | Spain | G06F 21/42 |
| | | | | 713/168 |
| 2009/0100265 | A1* | 4/2009 | Tadokoro | G07C 9/257 |
| | | | | 713/172 |
| 2010/0205660 | A1* | 8/2010 | Griffin | G06F 21/32 |
| | | | | 726/6 |
| 2011/0099200 | A1* | 4/2011 | Blount | H04L 63/123 |
| | | | | 714/E11.03 |
| 2011/0173455 | A1* | 7/2011 | Spalka | H04L 9/0869 |
| | | | | 713/189 |
| 2011/0246369 | A1* | 10/2011 | de Oliveira | G06Q 20/40 |
| | | | | 705/64 |
| 2012/0005732 | A1* | 1/2012 | Shinzaki | G06F 21/32 |
| | | | | 726/6 |
| 2012/0030743 | A1* | 2/2012 | Semba | G06F 21/33 |
| | | | | 726/7 |
| 2012/0224212 | A1* | 9/2012 | Xu | G07B 1/00 |
| | | | | 358/1.13 |
| 2012/0297464 | A1* | 11/2012 | Busch | G06F 11/1008 |
| | | | | 726/5 |
| 2013/0062420 | A1* | 3/2013 | Hamman | G06Q 20/385 |
| | | | | 235/494 |
| 2013/0151292 | A1* | 6/2013 | Van Deloo | G06Q 10/02 |
| | | | | 705/5 |
| 2013/0238903 | A1* | 9/2013 | Mizunuma | G06F 21/31 |
| | | | | 713/176 |
| 2015/0254451 | A1* | 9/2015 | Doane | G06F 21/44 |
| | | | | 726/1 |
| 2015/0355610 | A1* | 12/2015 | Petrocy | G05B 19/0421 |
| | | | | 700/20 |
| 2016/0117878 | A1* | 4/2016 | Pececnik | G07C 9/00571 |
| | | | | 340/5.53 |
| 2017/0171183 | A1* | 6/2017 | Lingappa | H04L 63/0435 |
| 2018/0278422 | A1* | 9/2018 | Young | G06Q 10/02 |
| 2018/0331833 | A1* | 11/2018 | Tomlinson | H04L 63/0861 |
| 2019/0034935 | A1* | 1/2019 | Zhai | G06Q 20/40145 |
| 2019/0058591 | A1* | 2/2019 | Sharpe | G06Q 20/38215 |
| 2019/0205468 | A1* | 7/2019 | Barnes, Jr. | G06F 16/635 |
| 2019/0228141 | A1 | 7/2019 | Shimizu et al. | |
| 2019/0294775 | A1* | 9/2019 | Okabe | G06F 21/35 |
| 2019/0340350 | A1* | 11/2019 | Campbell | G06F 21/32 |
| 2020/0184430 | A1* | 6/2020 | Umemoto | G06Q 10/02 |
| 2020/0327216 | A1* | 10/2020 | Lin | G06F 21/34 |
| 2021/0075788 | A1* | 3/2021 | Pasterk | H04L 9/3239 |
| 2021/0158656 | A1* | 5/2021 | Filipour | G07F 17/3262 |
| 2021/0240969 | A1* | 8/2021 | Edelen | G07C 9/257 |
| 2021/0357893 | A1* | 11/2021 | Kang | G06Q 20/1235 |
| 2022/0078178 | A1* | 3/2022 | Ebrahimi | H04L 63/0442 |
| 2022/0350928 | A1* | 11/2022 | Takatsuka | H04L 9/0662 |
| 2022/0384027 | A1* | 12/2022 | Kaleal, III | A61B 5/11 |
| 2023/0048703 | A1* | 2/2023 | Norieda | G06V 40/172 |
| 2023/0054629 | A1* | 2/2023 | Azanza Ladrón | G06F 21/32 |
| 2023/0068391 | A1* | 3/2023 | Norieda | E05B 65/02 |
| 2023/0237349 | A1* | 7/2023 | Donoho | G06Q 50/26 |
| | | | | 706/46 |
| 2023/0344815 | A1* | 10/2023 | Swain | H04L 63/0807 |
| 2024/0160716 | A1* | 5/2024 | Cornick | G07C 9/26 |

* cited by examiner

FIG. 6

| # | ID | FACE FEATURE QUANTITY DATA |
|---|---|---|
| 1 | 43145 | a895653d0751e0520d13f9393902f87··· |
| 2 | 10257 | 4aca474911a30364ad12016a5da2979··· |
| 3 | 57365 | 7deeb7e95da09d6fe27005d7471f3d9··· |
| 4 | 32098 | 8dbf5d4ea99330d76747e85d8ced9eb··· |
| : | : | : |

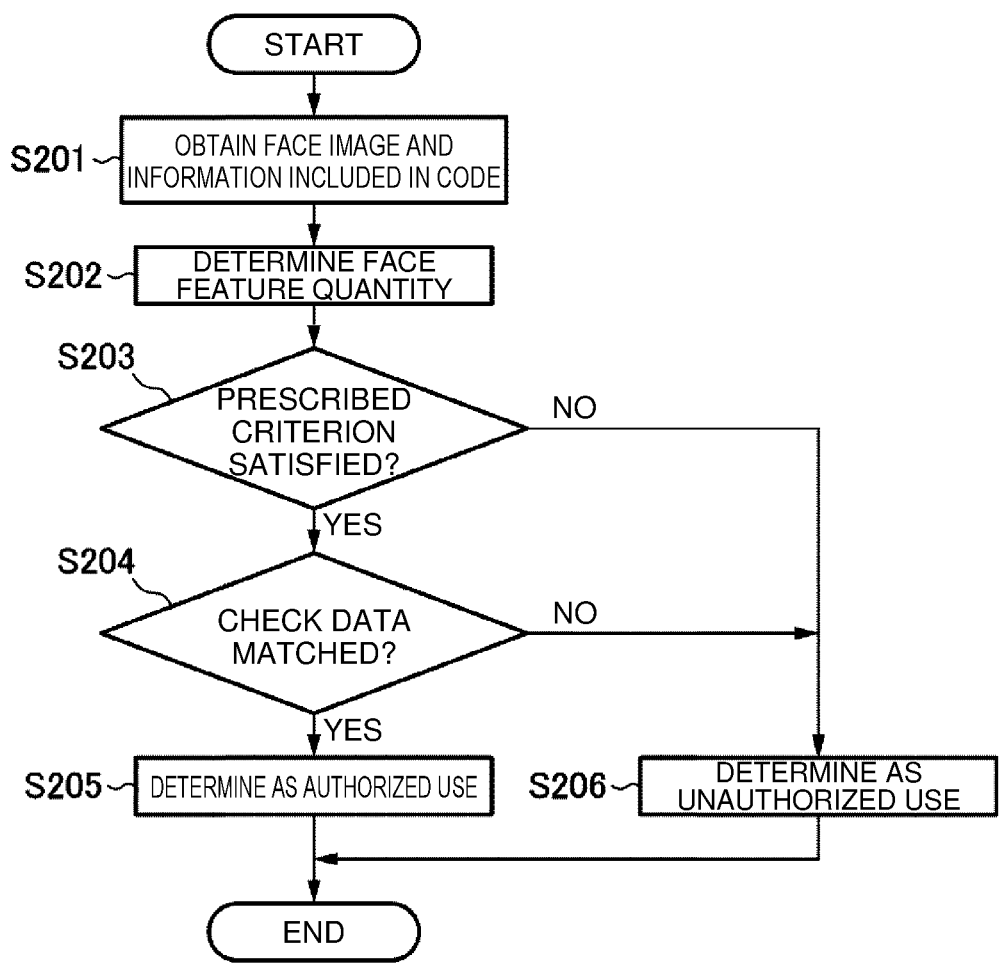

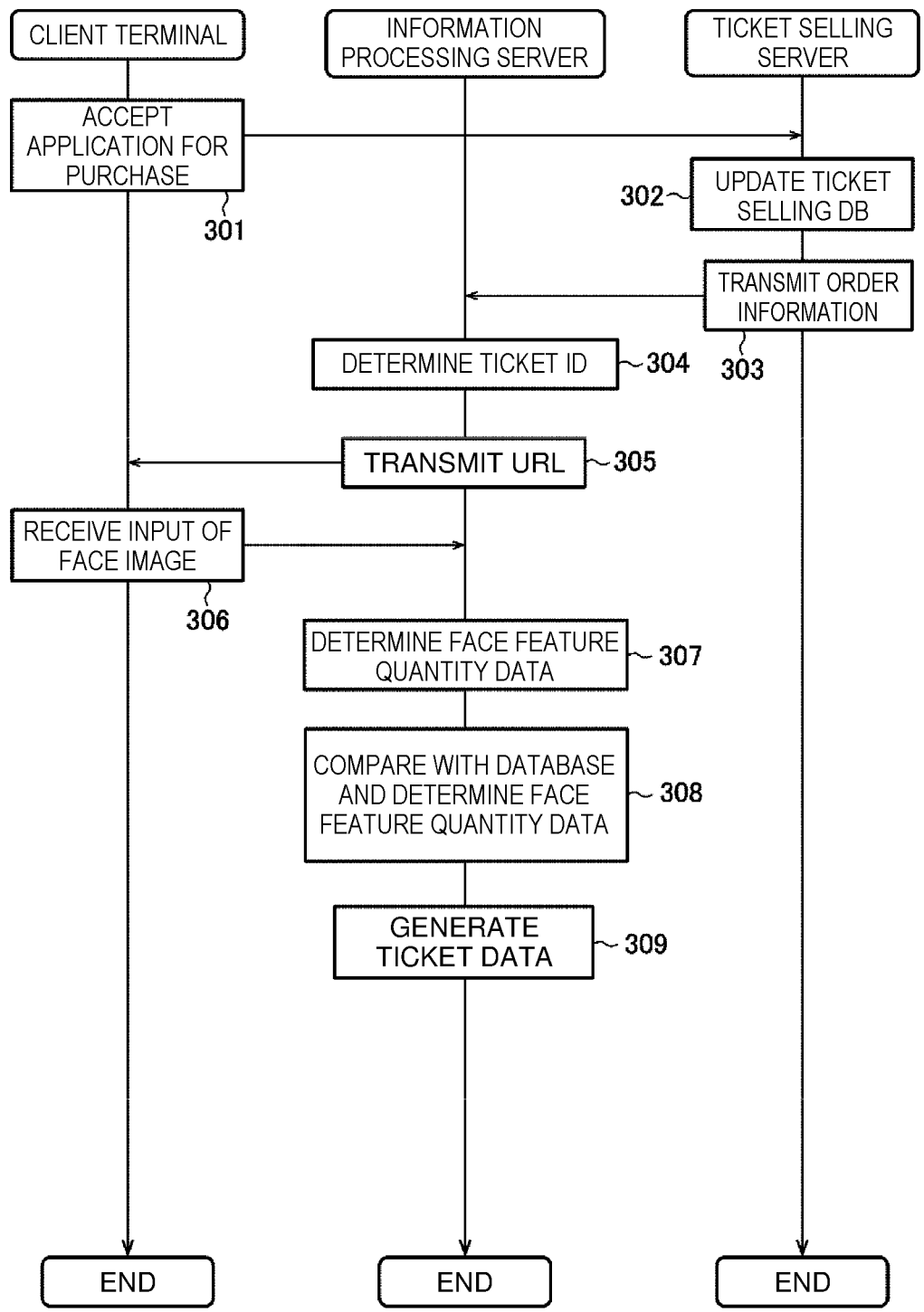

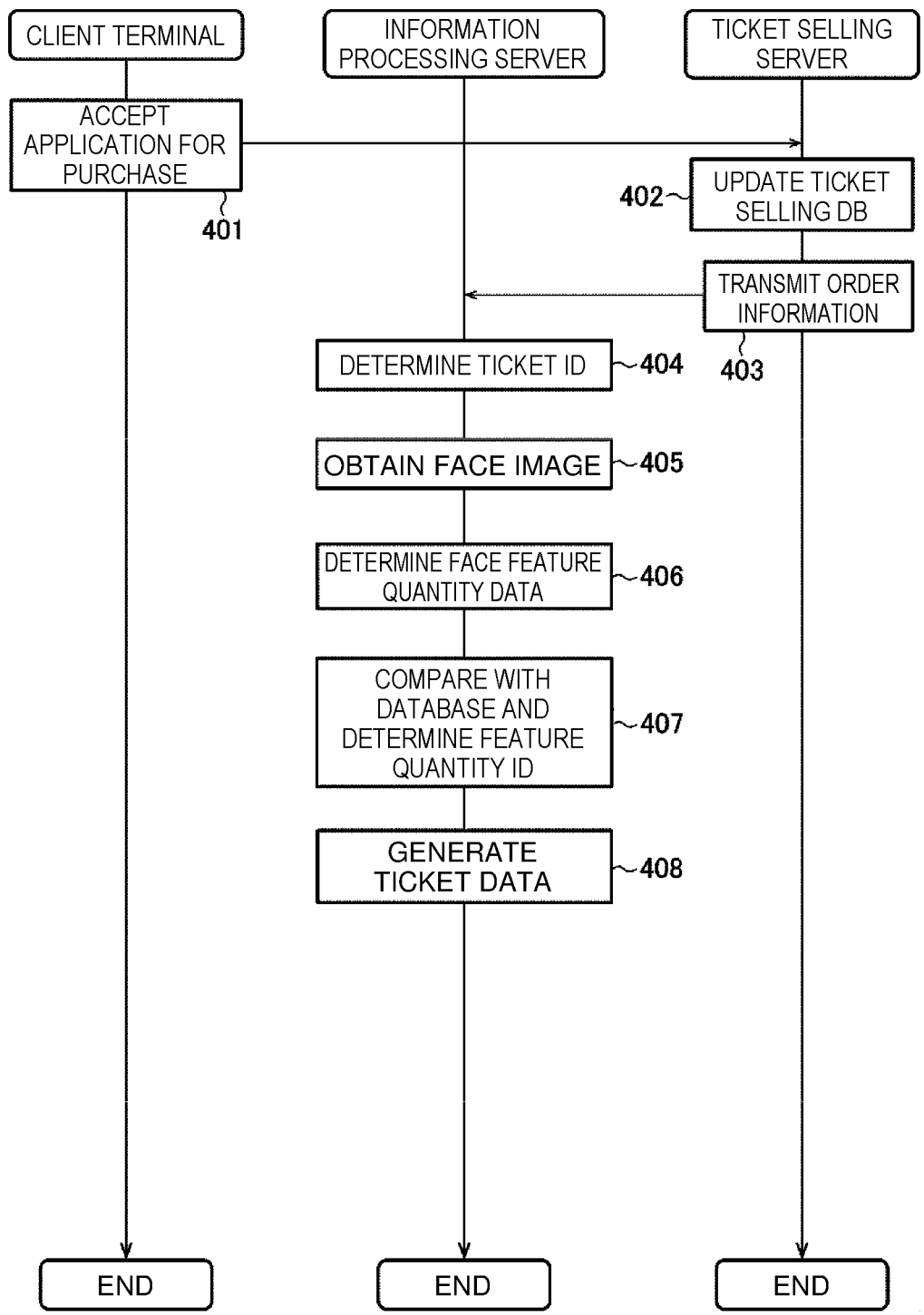

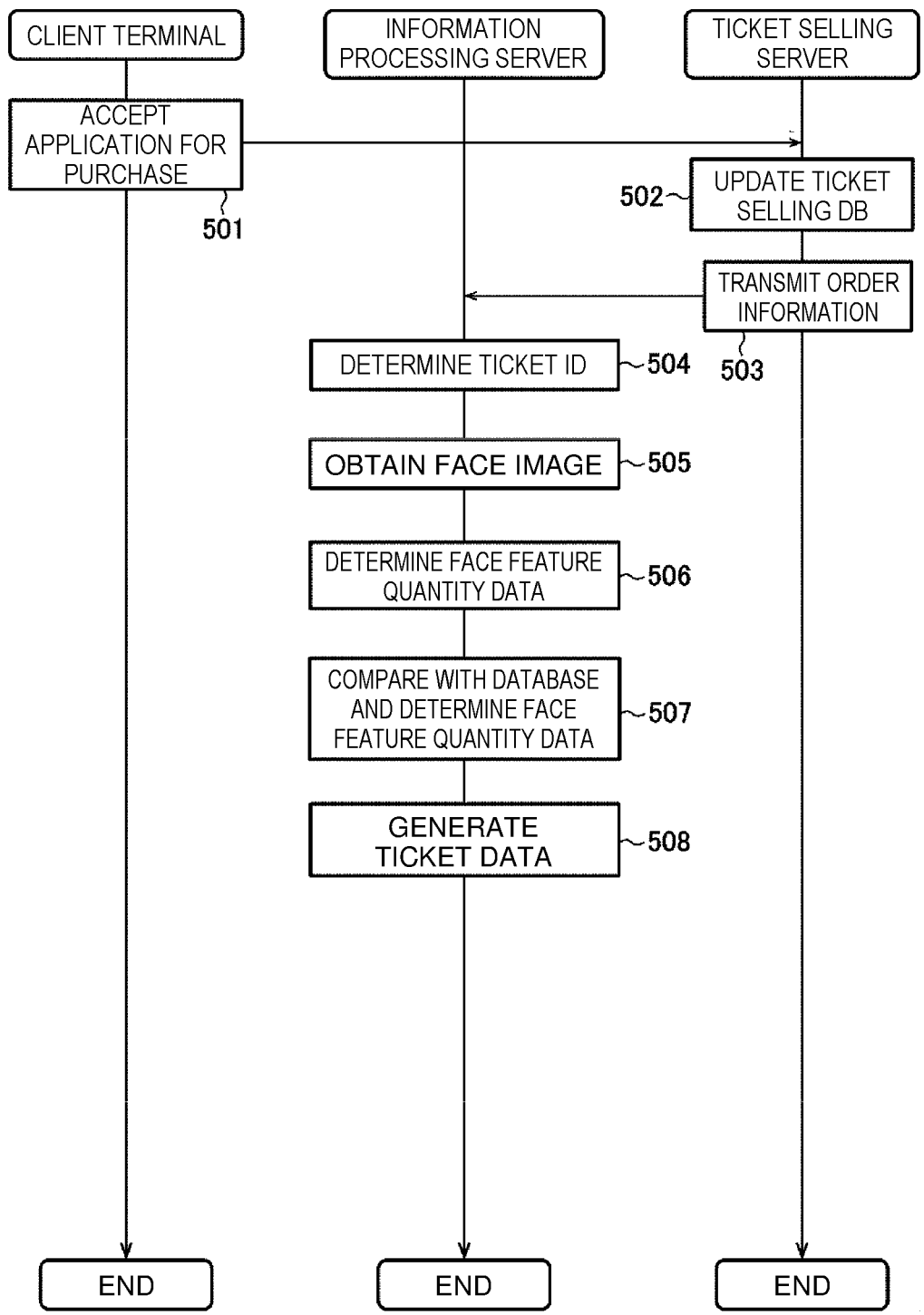

INFORMATION PROCESSING SERVER, INFORMATION PROCESSING SYSTEM, DETERMINATION DEVICE, AND METHOD

CROSS-REFERENCE TO RELATED APPLICATIONS

This application is based upon and claims the benefit of priority from the prior Japanese Patent Application No. 2020-070365, filed Apr. 9, 2020, and from PCT Patent Application No. PCT/JP2021/015002, the entire contents all of which are incorporated herein by reference.

FIELD

Embodiments described herein relate generally to an information processing server, an information processing system, a determination device, and a method.

BACKGROUND

There have been methods for preventing an unauthorized resale by means of a piece of biological information of a user who is to use a ticket. For example, Patent Literature 1 discloses recording information indicating a face of a holder of a ticket or feature quantities of the face as information on an authorized holder, capturing an image of a face of a person who is intending to get admittance at an admission gate, and determining whether the person intending to get admittance is the authorized holder by facial recognition in which the face of the person is checked against the face of the holder or the feature quantities of the face recorded on the ticket.

In a conventional method in which a user of a ticket is checked using facial recognition, such as the method disclosed in Patent Literature 1, an image of a face or feature quantities of the face are recorded on a ticket as information on a face of an authorized holder (user). An image of a face or feature quantities of the face are personal information on a user, and in a case where the image or the feature quantities are recorded on a ticket, there is the risk that the personal information unexpectedly passes to a third person, which is perceived as problems from the viewpoint of personal information protection and security. In contrast, a ticket including no personal information involves a problem in which the ticket can be easily resold.

The present invention is made to solve such problems, and a primary object of the present invention is to provide an information processing server and the like that are capable of preventing an unauthorized use of a ticket while reducing the risk of leakage of biological information on a user who uses the ticket.

BRIEF DESCRIPTION OF DRAWINGS

FIG. 6 illustrates an example of a feature quantity table in embodiments of the present invention.

FIG. 11 is a flowchart illustrating operation of the determination device in the first embodiment of the present invention.

FIG. 12 is a flowchart illustrating operation of an information processing server in a second embodiment of the present invention.

FIG. 13 is a flowchart illustrating operation of an information processing server in a third embodiment of the present invention.

FIG. 14 is a flowchart illustrating operation of an information processing server in a fourth embodiment of the present invention.

DETAILED DESCRIPTION

Figure 1:
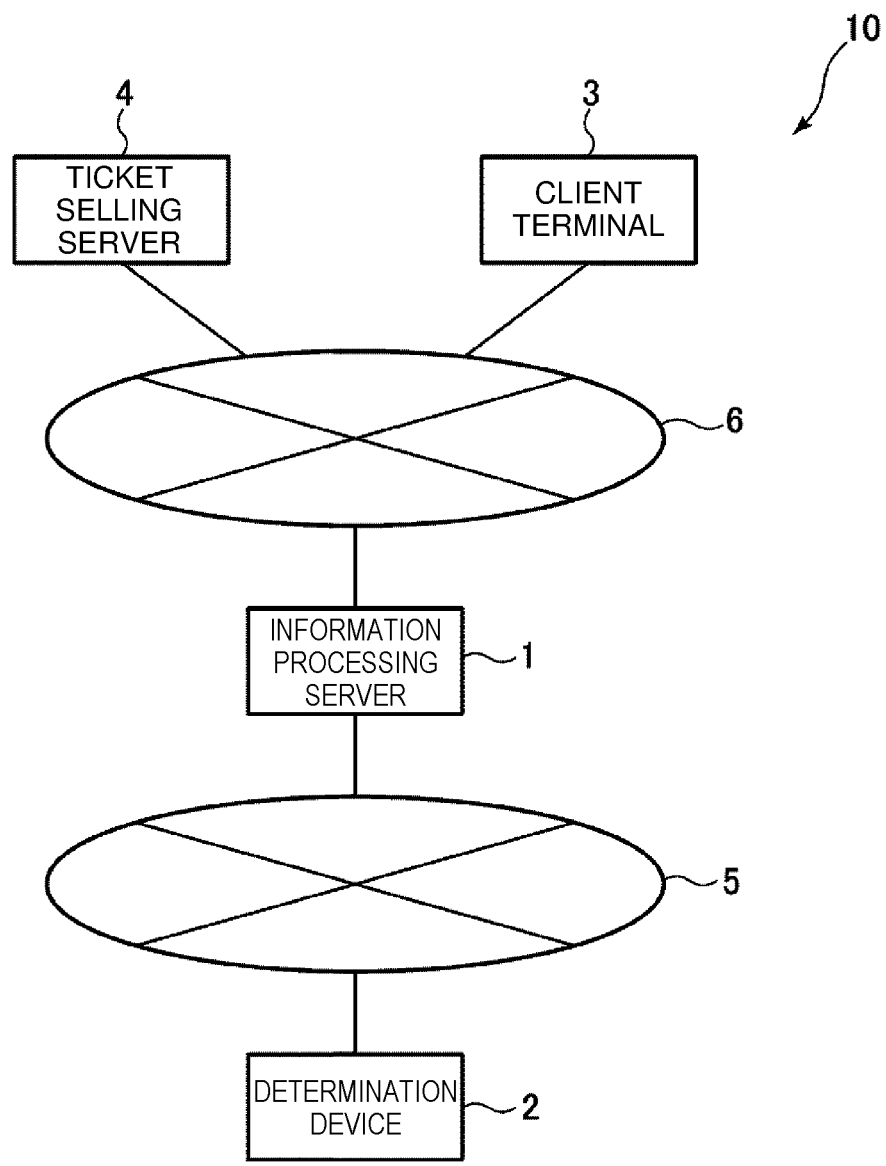
FIG. 1 is a general configuration diagram of an information processing system in a first embodiment of the present invention.

An information processing server in an embodiment of the present invention is
  an information processing server for managing a ticket, the information processing server including:
  a server storage unit that stores feature quantity data created in advance, the feature quantity data being feature quantity data that is obtainable from biological information, feature quantity identification information that can identify feature quantity data associated with the feature quantity data created in advance, and prescribed data that is identical to prescribed data stored in a determination device for determining a usage validity of a ticket; and
  a server control unit, wherein
  the server control unit is configured to
    determine a piece of ticket identification information that can identify a ticket for which an application for an issuance is accepted or obtain a piece of ticket identification information that is assigned in advance to the ticket,
    determine an item of feature quantity data from a piece of biological information on a user who is to use a ticket that is input,
    compare the determined item of feature quantity data with items of feature quantity data stored in the server storage unit to determine an item of feature quantity data having a prescribed similarity, and determine a piece of feature quantity identification information that is associated with the item of feature quantity data, and
    calculate check data by performing a prescribed calculation based on the prescribed data and at least one of the determined or obtained piece of ticket identification information and the determined piece of feature quantity identification information, generate a code to be attached to the ticket based on the calculated check data, the determined or obtained piece of ticket identification information, and the determined piece of feature quantity identification information, and generate ticket data for outputting the ticket to which the generated code is attached.

An information processing server in an embodiment of the present invention is an information processing server for managing a ticket, the information processing server including:

a server storage unit that stores feature quantity data created in advance, the feature quantity data being feature quantity data that is obtainable from biological information, and prescribed data that is identical to prescribed data stored in a determination device for determining a usage validity of a ticket; and a server control unit, wherein the server control unit is configured to determine a piece of ticket identification information that can identify a ticket for which an application for an issuance is accepted or obtain a piece of ticket identification information that is assigned in advance to the ticket, determine an item of feature quantity data from a piece of biological information on a user who is to use a ticket that is input, compare the determined item of feature quantity data with items of feature quantity data stored in the server storage unit to determine an item of feature quantity data having a prescribed similarity, and calculate check data by performing a prescribed calculation based on the prescribed data and at least one of the determined or obtained piece of ticket identification information and the determined item of feature quantity data, generate a code to be attached to the ticket based on the calculated check data, the determined or obtained piece of ticket identification information, and the determined item of feature quantity data, and generate ticket data for outputting the ticket to which the generated code is attached.

As an embodiment of the present invention, the server control unit compares the determined item of feature quantity data with the items of feature quantity data stored in the server storage unit to determine a plurality of items of feature quantity data having the prescribed similarity.

As an embodiment of the present invention, the items of feature quantity data stored in the server storage unit are each an item of feature quantity data obtained from a piece of biological information on an unreal person and an unspecified real person and are items of feature quantity data created in advance.

As an embodiment of the present invention, the items of feature quantity data stored in the server storage unit are items of face feature quantity data each indicating feature quantities corresponding to points, lines, or a surface in face features that are obtainable based on a face image.

As an embodiment of the present invention, the items of feature quantity data stored in the server storage unit are each an item of processed feature quantity data that is generated based on an item of feature quantity data, and the server control unit compares, instead of comparing the determined item of feature quantity data with the items of feature quantity data stored in the server storage unit, the determined item of feature quantity data with items of feature quantity data from which items of processed feature quantity data stored in the server storage unit are derived to determine an item of processed feature quantity data that is generated based on an item of feature quantity data having a prescribed similarity.

As an embodiment of the present invention, the server control unit is configured to transmit ticket data for outputting a ticket to which the generated code is attached to a client terminal that is capable of communicating with the information processing server via a network.

An information processing system in an embodiment of the present invention is an information processing system that includes the information processing server and the determination device, wherein the determination device includes:

a determination device storage unit that stores the prescribed data, and feature quantity data and feature quantity identification information associated with the feature quantity data that are identical to the feature quantity data and the feature quantity identification information stored in the server storage unit; and a determination device control unit, and the determination device control unit is configured to obtain a piece of ticket identification information, a piece of feature quantity identification information, and check data from a code attached to a ticket, obtain a piece of biological information from a user who presents the ticket, determine, based on the feature quantity data and the feature quantity identification information that are stored in the determination device storage unit in association with each other, whether an item of feature quantity data determined from the obtained piece of biological information and the obtained piece of feature quantity identification information satisfy a prescribed criterion, and determine whether check data that is calculated by performing the prescribed calculation based on the prescribed data and at least one of the obtained piece of ticket identification information and the obtained piece of feature quantity identification information matches the obtained check data.

As an embodiment of the present invention, the prescribed criterion is at least one of:

that the item of feature quantity data determined from the obtained piece of biological information and an item of feature quantity data with which the obtained piece of feature quantity identification information is associated in the determination device storage unit have a prescribed similarity; and that a piece of feature quantity identification information associated with an item of feature quantity data having a prescribed similarity includes the obtained piece of feature quantity identification information, the item of feature quantity data having the prescribed similarity being determined by comparing the item of feature quantity data determined from the obtained piece of biological information with the items of feature quantity data stored in the determination device storage unit.

An information processing system in an embodiment of the present invention is an information processing system that includes the information processing server and the determination device, wherein the determination device includes:
a determination device storage unit that stores the prescribed data and feature quantity data that is identical to the feature quantity data stored in the server storage unit; and
a determination device control unit, and
the determination device control unit is configured to
obtain a piece of ticket identification information, an item of feature quantity data, and check data from a code attached to a ticket,
obtain a piece of biological information from a user who presents the ticket,
determine whether an item of feature quantity data determined from the obtained piece of biological information and the obtained item of feature quantity data have a prescribed similarity, and
determine whether check data that is calculated by performing the prescribed calculation based on the prescribed data and at least one of the obtained piece of ticket identification information and the obtained item of feature quantity data matches the obtained check data.

A determination device in an embodiment of the present invention is
a determination device for determining a usage validity of a ticket, the determination device including:
a determination device storage unit that stores prescribed data identical to prescribed data stored in an information processing server capable of generating ticket data for outputting a ticket, and feature quantity data and feature quantity identification information associated with the feature quantity data, the feature quantity data being identical to feature quantity data that is obtainable from biological information stored in the information processing server and is created in advance, the feature quantity identification information being identical to feature quantity identification information that is stored in the information processing server and associated with the feature quantity data stored in the information processing server and that can identify the feature quantity data stored in the information processing server; and
a determination device control unit, wherein
the ticket includes a code attached to the ticket and generated based on a piece of ticket identification information that is assigned to the ticket and can identify the ticket, a piece of feature quantity identification information determined based on a piece of biological information on a user who is to use the ticket, and check data that is calculated by performing a prescribed calculation based on the prescribed data and at least one of the piece of ticket identification information and the piece of feature quantity identification information, and
the determination device control unit is configured to
obtain a piece of ticket identification information, a piece of feature quantity identification information, and check data from a code attached to a ticket,
obtain a piece of biological information from a user who presents the ticket,
determine, based on the feature quantity data and the feature quantity identification information that are stored in the determination device storage unit in association with each other, whether an item of feature quantity data determined from the obtained piece of biological information and the obtained piece of feature quantity identification information satisfy a prescribed criterion, and
determine whether check data that is calculated by performing the prescribed calculation based on the prescribed data and at least one of the obtained piece of ticket identification information and the obtained piece of feature quantity identification information matches the obtained check data.

A determination device in an embodiment of the present invention is
a determination device for determining a usage validity of a ticket, the determination device including:
a determination device storage unit that stores prescribed data identical to prescribed data stored in an information processing server capable of generating ticket data for outputting a ticket and feature quantity data identical to feature quantity data that is obtainable from biological information stored in the information processing server and is created in advance; and
a determination device control unit, wherein
the ticket includes a code attached to the ticket and generated based on a piece of ticket identification information that is assigned to the ticket and can identify the ticket, an item of feature quantity data determined based on a piece of biological information on a user who is to use the ticket, and check data that is calculated by performing a prescribed calculation based on the prescribed data and at least one of the piece of ticket identification information and the item of feature quantity data, and
the determination device control unit is configured to
obtain a piece of ticket identification information, an item of feature quantity data, and check data from a code attached to a ticket,
obtain a piece of biological information from a user who presents the ticket,
determine whether an item of the feature quantity data stored in the determination device storage unit and an item of feature quantity data determined from the obtained piece of biological information satisfy a prescribed criterion, and
determine whether check data that is calculated by performing the prescribed calculation based on the prescribed data and at least one of the obtained piece of ticket identification information and the obtained item of feature quantity data matches the obtained check data.

A method in an embodiment of the present invention is
a method for managing a ticket, the method being executed by a computer,
the method using a database that stores feature quantity data created in advance, the feature quantity data being feature quantity data that indicates a feature quantity obtainable from biological information, feature quantity identification information that can identify feature quantity data associated with the feature quantity data created in advance, and prescribed data that is identical to prescribed data stored in a determination device for determining a usage validity of a ticket, the method including:
a step of determining a piece of ticket identification information that can identify a ticket for which an application for an issuance is accepted or obtaining a piece of ticket identification information that is assigned in advance to the ticket;

a step of determining an item of feature quantity data from a piece of biological information on a user who is to use a ticket that is input;

a step of comparing the determined item of feature quantity data with items of feature quantity data stored in the database to determine an item of feature quantity data having a prescribed similarity, and determining a piece of feature quantity identification information that is associated with the item of feature quantity data; and a step of calculating check data by performing a prescribed calculation based on the prescribed data and at least one of the determined or obtained piece of ticket identification information and the determined piece of feature quantity identification information, generating a code to be attached to the ticket based on the calculated check data, the determined or obtained piece of ticket identification information, and the determined piece of feature quantity identification information, and generating ticket data for outputting the ticket to which the generated code is attached.

A method in an embodiment of the present invention is a method for managing a ticket, the method being executed by a computer, the method using a database that stores feature quantity data created in advance, the feature quantity data being feature quantity data that indicates a feature quantity obtainable from biological information, and prescribed data that is identical to prescribed data stored in a determination device for determining a usage validity of a ticket, the method including:

a step of determining a piece of ticket identification information that can identify a ticket for which an application for an issuance is accepted or obtaining a piece of ticket identification information that is assigned in advance to the ticket;

a step of determining an item of feature quantity data from a piece of biological information on a user who is to use a ticket that is input;

a step of comparing the determined item of feature quantity data with items of feature quantity data stored in the database to determine an item of feature quantity data having a prescribed similarity; and a step of calculating check data by performing a prescribed calculation based on the prescribed data and at least one of the determined or obtained piece of ticket identification information and the determined item of feature quantity data, generating a code to be attached to the ticket based on the calculated check data, the determined or obtained piece of ticket identification information, and the determined item of feature quantity data, and generating ticket data for outputting the ticket to which the generated code is attached.

A method in an embodiment of the present invention is a method for determining a usage validity of a ticket, the method being executed by a computer, the method using a database that stores prescribed data identical to prescribed data stored in an information processing server capable of generating ticket data for outputting a ticket, and feature quantity data and feature quantity identification information associated with the feature quantity data, the feature quantity data being identical to feature quantity data that is obtainable from biological information stored in the information processing server and is created in advance, the feature quantity identification information being identical to feature quantity identification information that is stored in the information processing server and associated with the feature quantity data stored in the information processing server and that can identify the feature quantity data stored in the information processing server, the ticket including a code attached to the ticket and generated based on a piece of ticket identification information that is assigned to the ticket and can identify the ticket, a piece of feature quantity identification information determined based on a piece of biological information on a user who is to use the ticket, and check data that is calculated by performing a prescribed calculation based on the prescribed data and at least one of the determined piece of ticket identification information and the determined piece of feature quantity identification information, the method including:

a step of obtaining a piece of ticket identification information, a piece of feature quantity identification information, and check data from a code attached to a ticket;

a step of obtaining a piece of biological information from a user who presents the ticket;

a step of determining, based on the feature quantity data and the feature quantity identification information that are stored in the database in association with each other, whether an item of feature quantity data determined from the obtained piece of biological information and the obtained piece of feature quantity identification information satisfy a prescribed criterion; and a step of determining whether check data that is calculated by performing the prescribed calculation based on the prescribed data and at least one of the obtained piece of ticket identification information and the obtained piece of feature quantity identification information matches the obtained check data.

A method in an embodiment of the present invention is a method for determining a usage validity of a ticket, the method being executed by a computer, the method using a database that stores prescribed data identical to prescribed data stored in an information processing server capable of generating ticket data for outputting a ticket and feature quantity data identical to feature quantity data that is obtainable from biological information stored in the information processing server and is created in advance, the ticket including a code attached to the ticket and generated based on a piece of ticket identification information that is assigned to the ticket and can identify the ticket, an item of feature quantity data determined based on a piece of biological information on a user who is to use the ticket, and check data that is calculated by performing a prescribed calculation based on the prescribed data and at least one of the determined piece of ticket identification information and the determined item of feature quantity data, the method including:

a step of obtaining a piece of ticket identification information, an item of feature quantity data, and check data from a code attached to a ticket;

a step of obtaining a piece of biological information from a user who presents the ticket;

a step of determining whether an item of the feature quantity data stored in the database and an item of feature quantity data determined from the obtained piece of biological information satisfy a prescribed criterion; and a step of determining whether check data that is calculated by performing the prescribed calculation based on the prescribed data and at least one of the obtained piece of ticket identification information and the obtained item of feature quantity data matches the obtained check data.

A program in an embodiment of the present invention causes a computer to execute the steps in the methods described above.

Embodiments of the present invention will be described below with reference to the drawings. A principal embodiment of the present invention is an information processing server 1, a determination device 2, or an information processing system 10 including the information processing server 1 and the determination device 2. In the drawings, the same reference numerals are supposed to indicate the same or equivalent parts unless otherwise stated, and detailed description thereof will not be given more than necessary. Data structures and a database structure in a database described in embodiments of the present invention are merely an example and do not limit the present invention.

In the embodiments of the present invention, a ticket is an admission ticket necessary to get admittance to a prescribed event such as a concert or a sports game. Tickets include electronic tickets and paper tickets. Tickets described in embodiments of the present invention can include coupons and tickets other than the admission tickets described above without departing the gist of the present invention and can be any medium that is of proprietary nature.

First Embodiment

[Information Processing System]

FIG. 1 is a general configuration diagram of an information processing system 10 in a first embodiment of the present invention. As illustrated in FIG. 1, an information processing system 10 includes an information processing server 1, a determination device 2, a client terminal 3, and a ticket selling server 4. The information processing server 1 is an apparatus for managing information concerning tickets. The determination device 2 is placed at an admission gate of an event venue and determines a usage validity of a ticket. The determination of a usage validity of a ticket includes determination of whether a combination of a presented ticket and a user who uses the ticket is authorized, that is, determination of whether the user who uses the ticket is an authorized holder of the ticket. The determination of a usage validity of a ticket also includes determination of a validity of a ticket itself (e.g., that the ticket is not a counterfeit ticket). For example, the determination device 2 is embodied in the form or part of a device for inspecting or verifying a ticket at the time of admission.

The information processing server 1 and the determination device 2 are connected to a network 5, being capable of communicating with each other. The information processing server 1, the client terminal 3, and the ticket selling server 4 are connected to a network 6, being capable of communicating with one another. FIG. 1 illustrates that the determination device 2 is configured not to communicate with or to be incapable of communicating with the client terminal 3 and the ticket selling server 4 and is connected to the information processing server 1 via the network 5, which is different from the network for communicating with the client terminal 3 and the ticket selling server 4. However, the determination device 2 may be connected to the information processing server 1 via the network for communicating with the client terminal 3 and the ticket selling server 4. The networks 5 and 6 are, for example, the Internet. Further, it suffices that the determination device 2 is capable of communicating with the information processing server 1 before being placed in an event venue and determining a usage validity of a ticket; the determination device 2 need not be connected to the information processing server 1 via the network 5 when determining a usage validity of a ticket. In the embodiments of the present invention, the client terminal 3 and the ticket selling server 4 each can be a known device or apparatus, and thus the information processing system 10 need not include the client terminal 3 and the ticket selling server 4.

[Information Processing Server]

Figure 2:
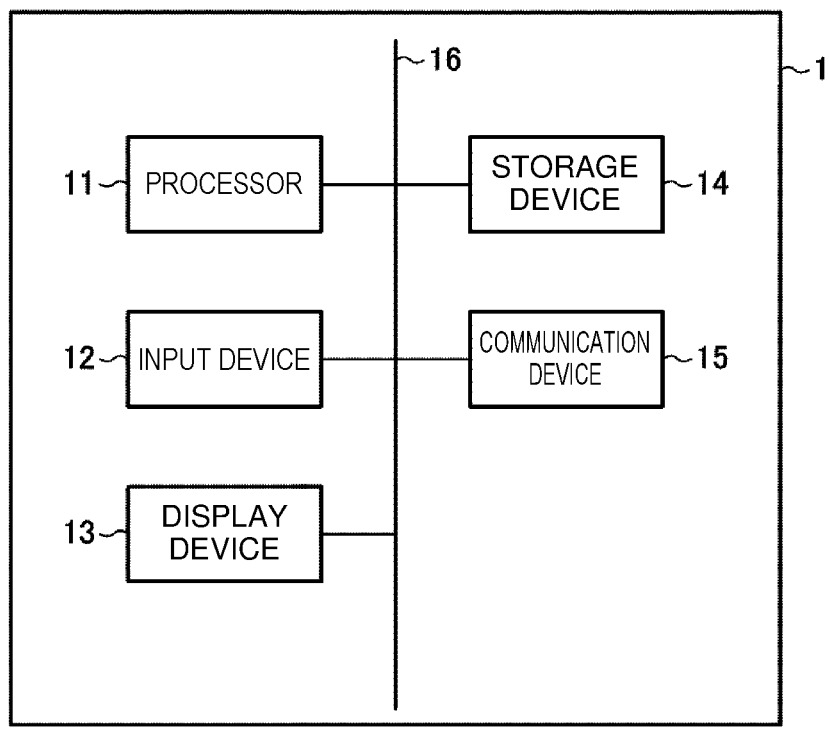
FIG. 2 is a block diagram illustrating a hardware configuration of the information processing server in the first embodiment of the present invention.

FIG. 2 is a block diagram illustrating a hardware configuration of the information processing server 1 in the first embodiment of the present invention. The information processing server 1 has a configuration that is similar to that of a typical server. The information processing server 1 includes a processor 11, an input device 12, a display device 13, a storage device 14, and a communication device 15. These constituent devices are connected together via a bus 16. Between the bus 16 and each constituent device, an interface is supposed to be interposed as needed. The information processing server 1 may be constituted by a plurality of computers.

The processor 11 controls operation of the information processing server 1; for example, the processor 11 is a CPU. As the processor 11, an electronic circuit such as an MPU may be used. The processor 11 reads a program and data stored in the storage device 14 and executes the program, performing various types of processing.

The input device 12 is a user interface that receives an input from a user to the information processing server 1; for example, the input device 12 is a touch panel, a touchpad, a mouse, or a keyboard. The display device (display) 13 displays a screen of an application, and the like to a user of the information processing server 1 under control by the processor 11.

The storage device 14 includes a main storage device and an auxiliary storage device. The main storage device is, for example, a semiconductor memory such as a RAM. A RAM is a volatile storage medium capable of reading and writing information at high speed and is used as a storage area and a working area when the processor 11 processes information. The auxiliary storage device stores various programs and data that is to be used by the processor 11 when executing the programs. The auxiliary storage device is, for example, a hard disk device but may be any nonvolatile storage or any nonvolatile memory as long as it is capable of storing information, and the auxiliary storage device may be removable.

The communication device 15 is a wireless LAN module that is capable of exchanging data with another computer such as a user terminal or a server via a network. The communication device 15 can be another type of wireless communication device such as a Bluetooth® module or can be a wired communication device such as an Ethernet® module and a USB interface.

Figure 3:
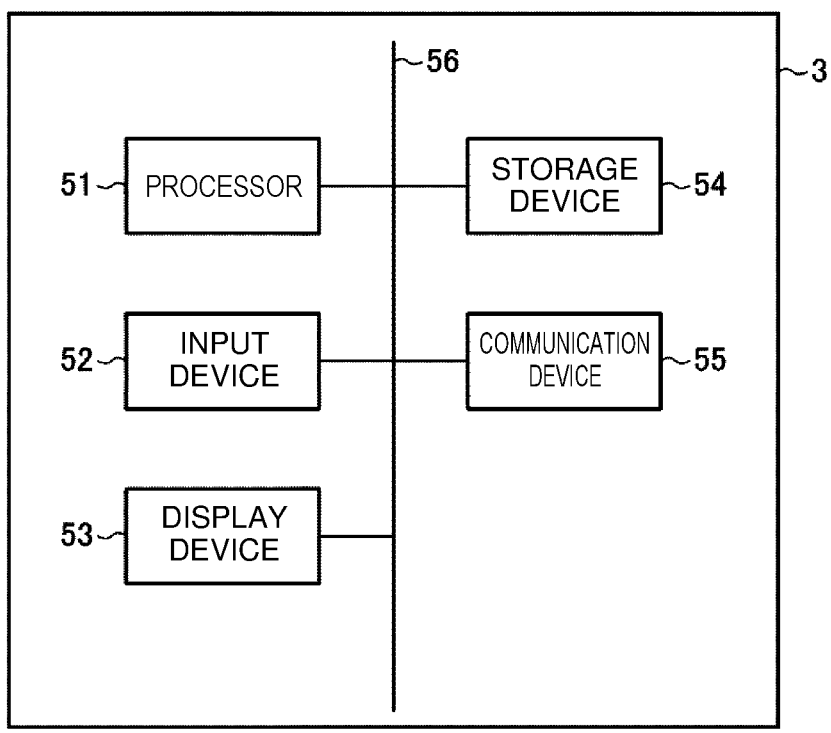
FIG. 3 is a block diagram illustrating a hardware configuration of a client terminal in the first embodiment of the present invention.

FIG. 3 is a block diagram illustrating a hardware configuration of the client terminal 3 in the first embodiment of the present invention. The client terminal 3 is, for example, a computer that is placed in a ticket shop, or a computer, a tablet terminal, or a smartphone that is possessed by a user who uses a ticket. The client terminal 3 includes a processor 51, an input device 52, a display device 53, a storage device 54, and a communication device 55. These constituent devices are connected together via a bus 56. Between the bus 56 and each constituent device, an interface is supposed to be interposed as needed. The components: the processor 51, the input device 52, the display device 53, the storage device 54, and the communication device 55 correspond to the processor 11, the input device 12, the display device 13, the storage device 14, and the communication device 15 described above, respectively, and have the same configurations as those of the processor 11, the input device 12, the display device 13, the storage device 14, and the communication device 15, respectively; therefore, description of the processor 51, the input device 52, the display device 53, the storage device 54, and the communication device 55 will be omitted. In one example, a web browser is installed in the client terminal 3. Using the web browser, a user can browse a web page or transmit data to a web server using an input form on a web page.

Figure 4:
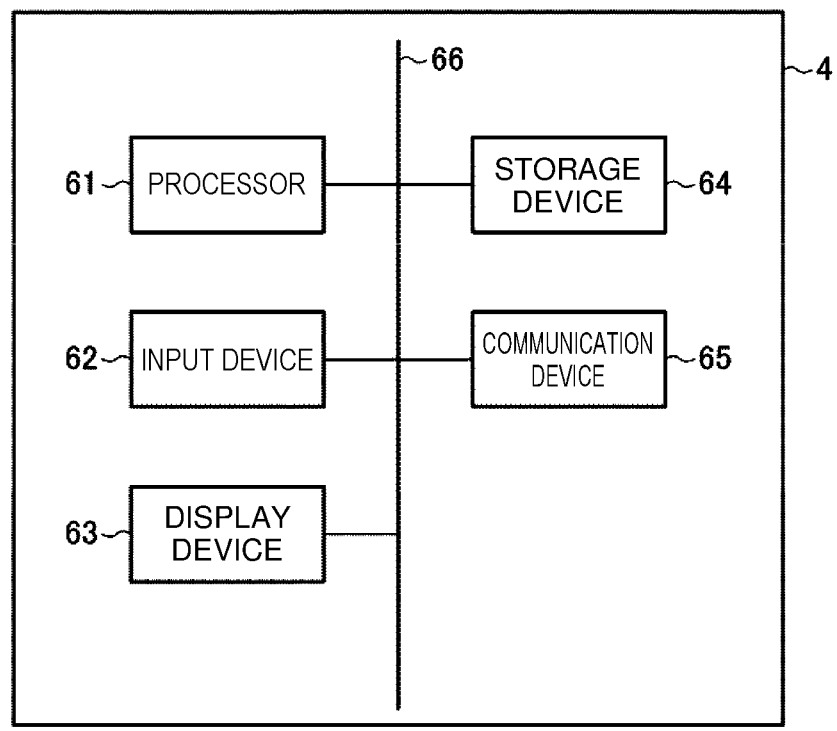
FIG. 4 is a block diagram illustrating a hardware configuration of a ticket selling server in the first embodiment of the present invention.

FIG. 4 is a block diagram illustrating a hardware configuration of the ticket selling server 4 in the first embodiment of the present invention. The ticket selling server 4 has a configuration that is similar to that of a typical server. The ticket selling server 4 includes a processor 61, an input device 62, a display device 63, a storage device 64, and a communication device 65. These constituent devices are connected together via a bus 66. Between the bus 66 and each constituent device, an interface is supposed to be interposed as needed. The components: the processor 61, the input device 62, the display device 63, the storage device 64, and the communication device 65 correspond to the processor 11, the input device 12, the display device 13, the storage device 14, and the communication device 15 described above, respectively, and have the same configurations as those of the processor 11, the input device 12, the display device 13, the storage device 14, and the communication device 15, respectively; therefore, description of the processor 61, the input device 62, the display device 63, the storage device 64, and the communication device 65 will be omitted. The ticket selling server 4 may be constituted by a plurality of computers.

Figure 5:
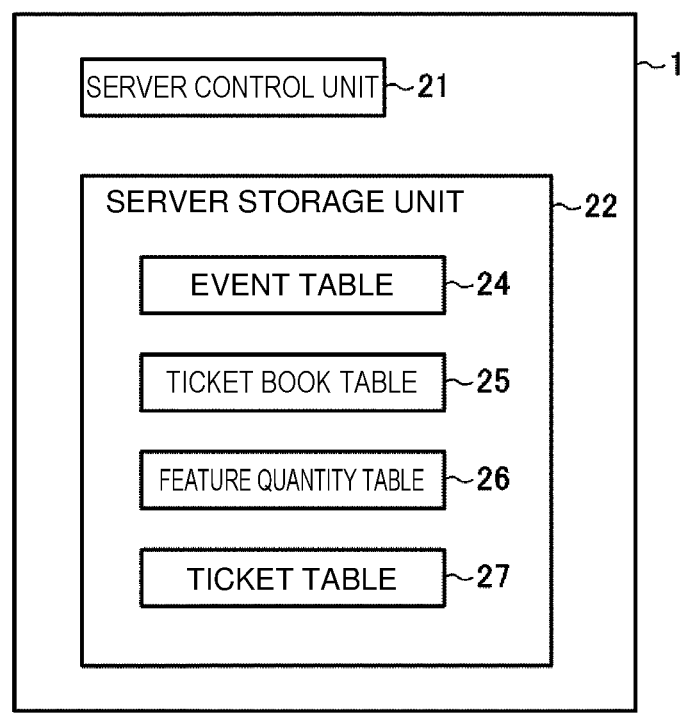
FIG. 5 illustrates an example of a functional block diagram of the information processing server in the first embodiment of the present invention.

FIG. 5 illustrates an example of a functional block diagram of the information processing server 1 in the first embodiment of the present invention. The information processing server 1 includes a server control unit 21 and a server storage unit 22. In the present embodiment, their functions are implemented by a program being executed by the processor 11 or implemented by the storage device 14. For example, the executed program is a program that is stored in the storage device 14 or received via the communication device 15. Regarding the functions implemented by reading the program, a part (function) may be implemented partly or entirely by another part. Note that these functions may be implemented in the form of hardware by building an electronic circuit or the like for implementing a part or all of the functions.

The server control unit 21 manages information concerning a ticket and generates data necessary for issuing a ticket. The information processing server 1 can function as a web server, and the server control unit 21 can have a function of performing processing that includes generating, transmitting, and the like of a web page. The information processing server 1 can function as an application server, and the server control unit 21 can have a function of performing control of connection to a database, transaction processing on the database, and the like.

The server storage unit 22 has a function of storing programs, data, and the like. The function of the server storage unit 22 is implemented by the storage device 14. The server storage unit 22 is capable of storing data for providing a web page, for example, an HTML document, an image, and a program for an application server function. In the present embodiment, the server storage unit 22 has a database function. The database function is implemented by the storage device 14 storing data (e.g., tables) and a program for various databases and by execution of the program.

The server storage unit 22 includes an event table 24, a ticket book table 25, a feature quantity table 26, and a ticket table 27.

The event table 24 includes, as data items, event information including information such as an event ID, an event name, a date, and a venue. The data items correspond to columns. The event table 24 can include, as a data item, a promoter ID for associating with a promoter table, which stores information concerning a promoter. A primary key of the event table 24 is the event ID, which is an exemplification of event identification information that can identify an event. The ticket book table 25 includes, as data items, a ticket book ID, and an event ID. A primary key of the ticket book table 25 is the ticket book ID. The feature quantity table 26 includes a feature quantity ID and face feature quantity data that can be obtained based on a face image. A primary key of the feature quantity table 26 is the feature quantity ID, which is an exemplification of feature quantity identification information that can identify face feature quantity data. The ticket table 27 includes, as data items, a ticket ID, a ticket book ID, ticket detail information, which includes information on a seat, a price of a ticket, and the like, and a feature quantity ID. A primary key of the ticket table 27 is the ticket ID, which is an exemplification of ticket identification information that can identify a ticket. In the present embodiment, the ticket ID, the feature quantity ID, and the event ID are numerical data. However, these IDs may be another type of data or the like that can be handled as numerical data. The server storage unit 22 stores a promoter table that includes, as data items, a promoter ID and promoter information including information such as contract details.

A ticket is issued for each event, and thus a ticket ID of a ticket that is issued for a given event is associated with an event ID of the given event. In the present embodiment, a ticket ID and a ticket book ID are associated with each other in the ticket table 27, and the ticket book ID and an event ID are associated with each other in the ticket book table 25, by which the ticket ID is associated with the event ID.

The face feature quantity data is feature quantity data that indicates feature quantities corresponding to points, lines, or a surface in face features extracted or obtained from a face image by a known feature quantity extraction method. For example, the face feature quantity data is obtained by executing a program in a known software library on a face image and is represented in the form of a multidimensional vector. FIG. 6 illustrates an example of the feature quantity table 26. In one example, as illustrated in FIG. 6, an item of face feature quantity data is an item of data that indicates a piece of numerical value information on a 128-dimensional vector (128-dimensional array structure) obtained by means of a known face feature quantity extraction program, and an item of the face feature quantity data is an item of data in which numerical values of a 128-dimensional vector in its respective dimensions are arranged as they are. The face feature quantity extraction program is stored in the server storage unit 22 (storage device 14). The face feature quantity extraction program may be a learned model. The face image may be two-dimensional data or may be three-dimensional data including a three-dimensional shape.

The face feature quantity data stored in the feature quantity table 26 is face feature quantity data obtained from face images of unreal persons or unspecified real persons, and the face feature quantity data is created in advance by means of the face feature quantity extraction program described above. The feature quantity table 26 stores a plurality of (e.g., 5000) items of face feature quantity data obtained from face images of a plurality of (e.g., 5000) unreal persons or unspecified real persons that are prepared in advance. As described above, the feature quantity table 26 stores items of face feature quantity data that correspond to face images of unreal persons or unspecified real persons but does not store items of face feature quantity data that correspond to face images of users who are to use tickets.

Note that the above-described data structure stored in the server storage unit 22 is an exemplification. In a preferred example, the server storage unit 22 stores ticket IDs, items of face feature quantity data that are created in advance, feature quantity IDs that are associated with the items of face feature quantity data, and event IDs that are identical to event IDs stored in the determination device 2.

In the present embodiment, the server control unit 21 has a function of creating a ticket management web page (a ticket management website) for each ticket ID. In one example, a ticket management web page includes a screen for registering a face image and displaying ticket data for outputting a ticket. It can be said that the ticket data is data for displaying a ticket face.

The ticket selling server 4 is a known server apparatus or server system operated by a ticket seller. The ticket selling server 4 functions as a web server, performing processing of generating, transmitting, and the like of a web page such as a ticket selling website (ticket selling page) in response to a request from the client terminal 3. The ticket selling server 4 can function as an application server as well and can perform control of connection to a database concerning ticket selling processing, transaction processing on the database, and the like. The storage device 64 is capable of storing data for providing a web page, for example, an HTML document, an image, a program for an application server function, and the like.

The ticket selling server 4 includes a ticket selling database that stores ticket information concerning a ticket managed by a ticket seller and ticket stock information indicating whether a ticket has been purchased. The ticket information stored in the ticket selling database includes, for example, event information including a date and a venue of an event, ticket detail information including a seat type or a specific seat number and price information, and the like, and thus includes information necessary for selling a ticket.

A user operates the client terminal 3 and makes a selection of a ticket, an application for a purchase of the selected ticket, a payment for the ticket, and the like via a ticket selling website. From the client terminal 3, the ticket selling server 4 receives order information including user information and ticket information on an accepted application for a purchase. The ticket information included in the order information includes, for example, event information including a date and a venue of an event, ticket detail information including a seat type or a specific seat number and price information, and the like, and thus includes information necessary for specifying a ticket. In the present embodiment, the user information included in the order information is an email address of a user from which the client terminal 3 receives an input via the ticket selling website. The email address can be substituted with a telephone number, an ID of an SNS or a chat tool, or the like. A piece of order information is created for each order that is accepted from client terminal 3 and transmitted to the ticket selling server 4.

Figure 7:
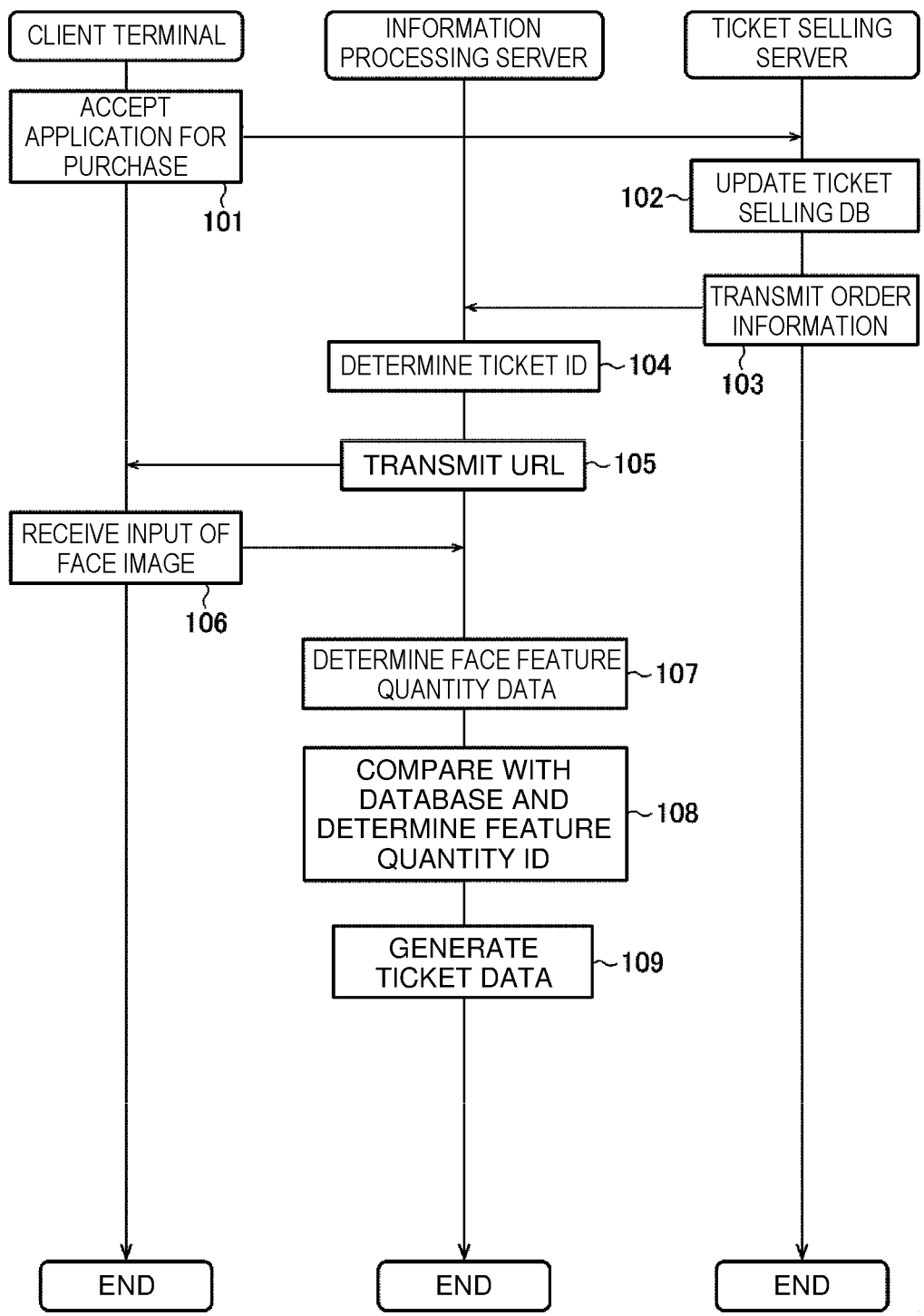
FIG. 7 is a flowchart illustrating operation of the information processing server in the first embodiment of the present invention.

FIG. 7 is a flowchart illustrating operation of the information processing server 1 in the first embodiment of the present invention.

In step 101, the client terminal 3 receives an input of an application for a purchase of a ticket via a ticket selling website. Via the ticket selling website, the client terminal 3 transmits a piece of order information including a piece of user information and a piece of ticket information concerning the ticket for which the application for the purchase has been accepted, to the ticket selling server 4. The piece of ticket information on the accepted application for the purchase is a piece of ticket information concerning one or more tickets.

In step 102, receiving the piece of order information from the client terminal 3, the ticket selling server 4 accepts the application for the purchase of the ticket from the client terminal 3 and updates the ticket selling database.

In step 103, for each accepted piece of order information, the ticket selling server 4 transmits the piece of order information to the information processing server 1. In this manner, by the ticket selling server 4 transmitting a piece of order information to the information processing server 1, the ticket selling server 4 and the information processing server 1 can synchronize data between the servers. The synchronization between the servers may be performed periodically. Receiving the piece of order information from the ticket selling server 4, the information processing server 1 accepts the application for the purchase of the ticket.

In step 104, the server control unit 21 determines a ticket ID for the ticket for which the application for the purchase has been accepted. Specifically, the server control unit 21 determines a ticket book ID and a ticket ID that are associated with a ticket specified from the received piece of order information. In one example, determining a ticket ID for a ticket for which an application for a purchase has been accepted is creating a new ticket ID based on an application for a purchase of a ticket and assigning the ticket ID to the ticket for which the application has been accepted. In one example, determining a ticket ID for a ticket for which an application for a purchase has been accepted is assigning a ticket ID that is created in advance in the ticket table 27 to the ticket for which the application for the purchase has been accepted. The exemplification holds true for the ticket book ID.

The server control unit 21 determines an event ID that corresponds to a piece of event information included in the received piece of ticket information and stores the event ID in the ticket book table 25 in association with the ticket book ID. The server control unit 21 stores the ticket book ID determined for the same piece of order information as that including the ticket ID in the ticket table 27 in association with the ticket ID. For example, in a case where the piece of ticket information received from the ticket selling server 4 is a piece of ticket information concerning a plurality of tickets (a number A of tickets), the server control unit 21 determines one ticket book ID and the number A of ticket IDs. In one example, the server control unit 21 stores a piece of ticket detail information in the received piece of ticket information in the ticket table 27 in association with the ticket ID.

Before a ticket for an intended event concerned is issued, an event ID of the event is created, and event table 24 stores the created event ID and a piece of event information that is associated with the event ID. The event ID determined in step 104 is identical to an event ID stored in the determination device 2 that determines a usage validity of a ticket to which a ticket ID associated with the event ID is assigned. The information processing server 1 may share event IDs with the ticket selling server 4; in this case, a piece of ticket information received by the information processing server 1 from the ticket selling server 4 includes an event ID. Note that a piece of order information received by the information processing server 1 need not be identical to a piece of order information received by the ticket selling server 4 from the client terminal 3 as long as the pieces of the order information each include a piece of ticket information and a piece of user information.

In step 105, the server control unit 21 transmits an address (URL) of a ticket management web page linked to the ticket ID to an email address of a user included in the piece of user information included in the received piece of order information. The server control unit 21 transmits an address of one ticket management web page for one ticket ID.

In step 106, the client terminal 3 accesses the URL received from the information processing server 1 and displays the ticket management web page. The ticket management web page displays a screen that asks the user to input a face image. Via the ticket management web page, the client terminal 3 receives an input of the face image from the user and transmits the face image to the information processing server 1.

In step 107, from the face image of the user who is to use the input ticket, an item of face feature quantity data is determined. In one example, the server control unit 21 determines the item of face feature quantity data from the received face image using the face feature quantity extraction program stored in the server storage unit 22. For example, determining the item of face feature quantity data by the server control unit 21 is calculating the item of face feature quantity data from the received face image or obtaining the item of face feature quantity data from the received face image.

In step 108, the server control unit 21 compares the item of face feature quantity data determined in step 107 with the face feature quantity data stored in the feature quantity table 26 to determine an item of face feature quantity data that has a prescribed similarity in the face feature quantity data stored in the feature quantity table 26. In one example, in step 108, the server control unit 21 compares the item of face feature quantity data determined in step 107 with each item of the face feature quantity data stored in the feature quantity table 26 and calculates a similarity of the item of the face feature quantity data stored in the feature quantity table 26. Alternatively, in one example, the server control unit 21 compares the item of face feature quantity data determined in step 107 with each item of prescribed face feature quantity data in the face feature quantity data stored in the feature quantity table 26 and calculates a similarity of the item of prescribed face feature quantity data. The server control unit 21 determines a feature quantity ID that is associated with the determined item of the face feature quantity data. In one example, the server control unit 21 stores the feature quantity ID determined in association with the ticket ID, in the ticket table 27. In the present embodiment, for convenience of description, the server control unit 21 is supposed to determine one of items of the face feature quantity data stored in the feature quantity table 26. Note that, to reduce a computational complexity of information processing, the item of face feature quantity data determined by the server control unit 21 in step 107 and the items of face feature quantity data stored in the feature quantity table 26 can be made to have the same data structure. This holds true for the other embodiments.

In the present embodiment, an item of face feature quantity data is an item of data indicating a piece of numerical value information in the form of a 128-dimensional vector, and the similarity corresponds to a Euclidean distance between two items of face feature quantity data compared with each other. The server control unit 21 determines a Euclidean distance between two items of face feature quantity data compared with each other is less than or equal to a prescribed value. That is, the server control unit 21 determines, from the items of face feature quantity data stored in the feature quantity table 26, an item of the face feature quantity data that is stored in the feature quantity table 26 and that gives a Euclidean distance from the item of face feature quantity data determined in step 107 being less than or equal to the prescribed value. In one example, the server control unit 21 determines any item of face feature quantity data that gives a Euclidean distance less than or equal to the prescribed value. Alternatively, in one example, the server control unit 21 determines an item of face feature quantity data that gives the shortest Euclidean distance.

In step 109, the server control unit 21 calculates check data by performing a prescribed calculation based on the ticket ID determined in step 104, the feature quantity ID determined in step 108, and the event ID determined in step 104. Based on the ticket ID determined in step 104, the feature quantity ID determined in step 108, and the calculated check data, the server control unit 21 generates a code to be attached to a ticket. The server control unit 21 generates ticket data for outputting the ticket to which the generated code is attached.

In the present embodiment, the prescribed calculation is implemented by a check data calculation program, and the server control unit 21 calculates the check data using the check data calculation program. In one example, in the check data calculation program, the sum of the ticket ID determined in step 104, the feature quantity ID determined in step 108, and the event ID determined in step 104 is calculated, and the last one or two digits of the sum is calculated as the check data. In one example, in the check data calculation program, the ticket ID determined in step 104, the feature quantity ID determined in step 108, and the event ID determined in step 104 are input into a prescribed function, and an output value is calculated as the check data. For example, the prescribed function is a one-way function. In this manner, the check data is calculated by performing the prescribed calculation on a plurality of values, and thus it is difficult to determine an original value from the check data. In one example, the check data is numerical data having one or more digits. In one example, the check data is a check digit. The check data calculation program is stored in the server storage unit 22.

The code generated by the server control unit 21 is a QR Code® that stores items of data corresponding to the ticket ID, the feature quantity ID, and the check data. For example, the items of data are stored at their respective predetermined positions in a data region of the QR Code®. Note that the code generated by the server control unit 21 can be a one-dimensional code or a two-dimensional code other than a QR Code®.

In one example, the information processing server 1 transmits the ticket data generated in step 109 to the client terminal 3 via the ticket management web page, and the client terminal 3 receives the ticket data. In one example, the information processing server 1 transmits, to the email address of the user, an address of a web page from which the generated ticket data can be downloaded.

Based on the received ticket data, the client terminal 3 outputs a ticket to which the code generated in step 109 is attached. In one example, based on the received ticket data, the client terminal 3 displays the ticket to which the code generated in step 109 is attached on the display device 53 as an electronic ticket. In one example, based on the received ticket data, the client terminal 3 outputs a paper ticket to which the code generated in step 109 is attached from a printer that is connected to the client terminal 3 so as to be capable of communicating with the client terminal 3. When the ticket data is image data, the client terminal 3 displays the ticket data as it is, and when the ticket data is processed data or encrypted data, the client terminal 3 outputs the ticket using an application that supports the processed data or encrypted data. Note that a client terminal 3 that accepts an application for a purchase, a client terminal 3 that accepts an input of a face image, and a client terminal 3 that receives ticket data can be the same terminal, or different terminals can be configured to be available, according to usage.

In one example, after generating the ticket data in step 109, the server control unit 21 can accept a change of the user who is to use the ticket, via the ticket management web page. In order for a user to become an authorized holder of a transferred ticket, the user is required to access a ticket management web page that is linked to an ID of the ticket and input a face image of the user by operating the client terminal 3. Via, for example, the ticket management web page linked to the ticket ID of the transferred ticket, the server control unit 21 can accept the input of the face image of the user who is to use the ticket. Receiving the input of the face image of the user anew, the server control unit 21 executes processes of steps 107 to 109, generating new ticket data.

Figure 8:
FIG. 8 is a picture illustrating an example of a paper ticket output based on ticket data.
Figure 10:
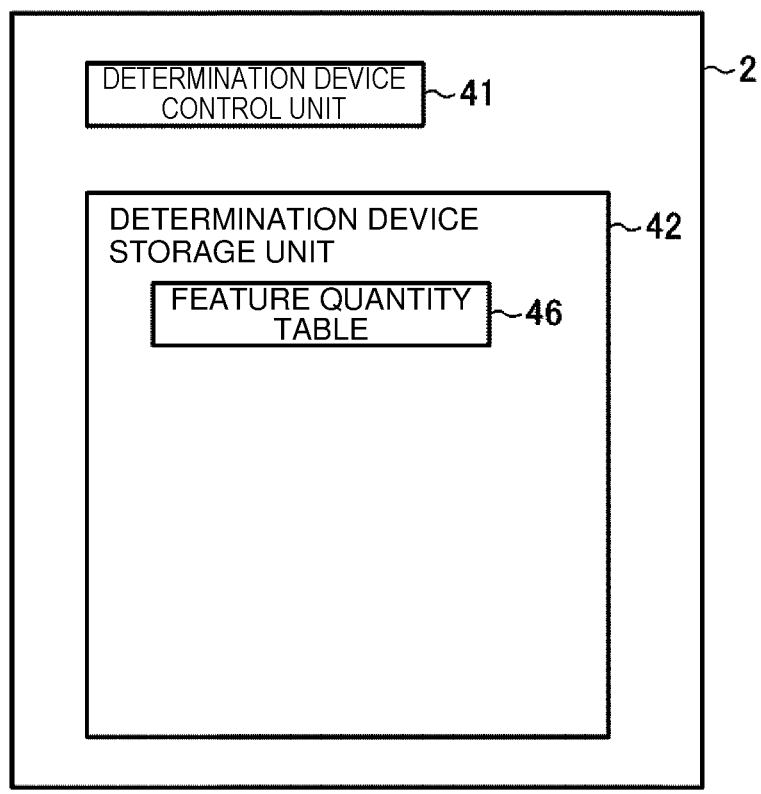
FIG. 10 illustrates an example of a functional block diagram of the determination device in the first embodiment of the present invention.

FIG. 8 is a picture illustrating an example of the paper ticket output based on the ticket data. As illustrated in FIG. 10, the paper ticket is printed with event information 71 including an event name, a date, a venue, and the like, and a QR Code® 72 generated by the server control unit 21. As with the paper ticket, an electronic ticket includes event information 71 and a QR Code® 72.

In the present embodiment, in a case where a face image of a user who is to use a ticket is input, and the information processing server 1 can obtain the face image, the information processing server 1 can be configured such that this flowchart does not include steps 105 and 106. In the present embodiment, it is only required that the information processing server 1 receives a piece of order information concerning a ticket for which an application for a purchase has been accepted, and the information processing server 1 can be configured such that this flowchart does not include step 101 to step 103.

[Determination Device]

Figure 9:
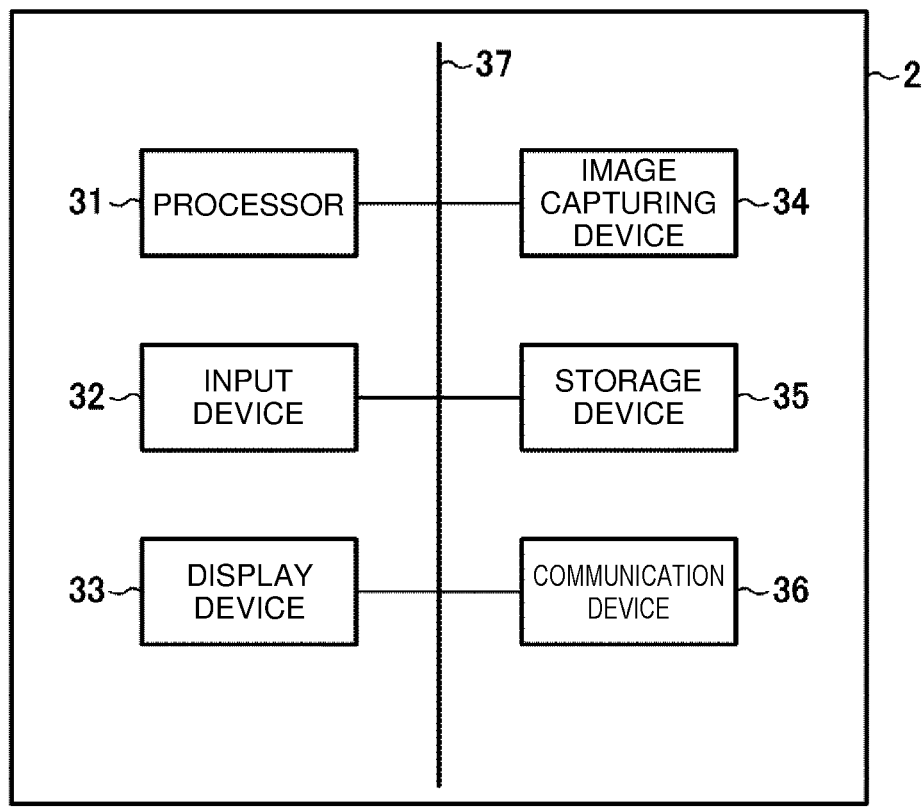
FIG. 9 is a block diagram illustrating a hardware configuration of a determination device in the first embodiment of the present invention.

FIG. 9 is a block diagram illustrating a hardware configuration of the determination device 2 in the first embodiment of the present invention. The determination device 2 includes a processor 31, an input device 32, a display device 33, an image capturing device 34, a storage device 35, and a communication device 36. These constituent devices are connected together via a bus 37. Between the bus 37 and each constituent device, an interface is supposed to be interposed as needed. In the present embodiment, the determination device 2 is a tablet terminal such as an iPad®. Note that the determination device 2 is not limited to a tablet terminal. For example, the determination device 2 can have a configuration including a main part that has main functions of the determination device 2 and the image capturing device 34 that is connected to the main part so as to be capable of communicating with the main part.

The processor 31 controls operation of the information processing server 1; for example, the processor 31 is a CPU. As the processor 31, an electronic circuit such as an MPU may be used. The processor 31 reads a program and data stored in the storage device 35 and executes the program, thereby executing various types of processing.

The input device 32 is a user interface that receives an input from a user to the information processing server 1. The display device (display) 33 displays a screen of an application, and the like to a user of the information processing server 1 under control by the processor 31. In the present embodiment, the determination device 2 includes a touch panel 38 as the input device 32, the touch panel 38 also functions as the display device 33, and the input device 32 and the display device 33 are formed into an integral structure.

The image capturing device (imaging device) 34 captures a still image or a video of real space (imaging the real space in the form of a still image or a video) and stores data on the captured image or video in the storage device 35. The image capturing device 34 is a camera constituted by, for example, an image sensor.

The storage device 35 includes a main storage device and an auxiliary storage device. The main storage device is, for example, a semiconductor memory such as a RAM. A RAM is a volatile storage medium capable of reading and writing information at high speed and is used as a storage area and a working area when the processor 31 processes information. The auxiliary storage device stores various programs and data that is to be used by the processor 31 when executing the programs. The auxiliary storage device is, for example, a hard disk device but may be any nonvolatile storage or any nonvolatile memory as long as it is capable of storing information, and the auxiliary storage device may be removable.

The communication device 36 is a wireless LAN module that is capable of exchanging data with another computer such as a user terminal or a server via a network. The communication device 36 can be another type of wireless communication device such as a Bluetooth® module or can be a wired communication device such as an Ethernet® module and a USB interface. Note that it suffices that the determination device 2 is configured to receive data from the information processing server 1 when determining a usage validity of a ticket, and thus the determination device 2 need not include the communication device 36.

FIG. 10 illustrates an example of a functional block diagram of the determination device 2 in the first embodiment of the present invention. The determination device 2 includes a determination device control unit 41 and a determination device storage unit 42. In the present embodiment, their functions are implemented by a program being executed by the processor 31 or implemented by the storage device 35. For example, the executed program is a program that is stored in the storage device 35 or received via the communication device 36. Regarding the functions implemented by reading a program, a part (function) may be implemented partly or entirely by another part. Note that these functions may be implemented in the form of hardware by building an electronic circuit or the like for implementing a part or all of the functions.

In the present embodiment, the determination device storage unit 42 has a database function. The database function is implemented by the storage device 35 storing data (e.g., tables) and a program for various databases and by execution of the program.

The determination device control unit 41 determines a usage validity of a ticket, for example, whether a combination of a presented ticket and a user who uses the ticket is authorized. The determination device storage unit 42 has a function of storing programs and data. The function of the determination device storage unit 42 is implemented by the storage device 35. The determination device storage unit 42 stores a feature quantity table 46, which is the same feature quantity table as the feature quantity table 26 stored in the server storage unit 22. The feature quantity table 46 is stored before the determination device 2 is placed in an event venue and determines usage validities of tickets.

FIG. 11 is a flowchart illustrating operation of the determination device 2 in the first embodiment of the present invention. The determination device 2 is placed at an admission gate of an event venue such that the image capturing device 34 can capture images of tickets and faces of users who use the tickets when the users who use the tickets get admittance to the event venue. The determination device storage unit 42 (storage device 35) stores an event ID of an intended event where the determination device 2 is placed.

In step 201, the determination device control unit 41 brings the image capturing device 34 into operation, capturing an image of a ticket and a user who is presenting the ticket, obtaining a face image of the user, and obtaining a ticket ID, a feature quantity ID, and check data from a code attached to the ticket. In one example, when capturing an image of a face of the user and the code attached to the ticket, the determination device control unit 41 displays the image being captured on the display device 33 and gives a display that provides guidance in such a manner as to move the face of the user who is to use the ticket and the ticket a prescribed area. In one example, the function of the determination device control unit 41 is implemented by installing, in the determination device 2, a program that captures an image of a code and then obtains data included in the code.

In step 202, the determination device control unit 41 determines an item of face feature quantity data from the obtained face image of the user using the same face feature quantity extraction program as the face feature quantity extraction program stored in the server storage unit 22. The face feature quantity extraction program is stored in the determination device storage unit 42.

In step 203, the determination device control unit 41 determines whether the feature quantity ID obtained in step 201 and the item of face feature quantity data determined in step 202 satisfy a prescribed criterion based on feature quantity IDs and items of face feature quantity data stored in the feature quantity table 46 in association with one another.

In one example, determining whether the prescribed criterion is satisfied is determining whether the item of face feature quantity data determined in step 202 and an item of face feature quantity data that is associated in feature quantity table 46 with the feature quantity ID obtained in step 201 have a prescribed similarity. In this case, satisfying the prescribed criterion is having the prescribed similarity. In one example, determining whether the prescribed criterion is satisfied is comparing the item of face feature quantity data determined in step 202 with the items of face feature quantity data stored in the feature quantity table 46 to determine items of face feature quantity data that have the prescribed similarity out of the items of face feature quantity data stored in the feature quantity table 46, determining (obtaining) feature quantity IDs associated with the items of face feature quantity data having the prescribed similarity, and determining whether the determined feature quantity IDs include the feature quantity ID obtained in step 201. In this case, satisfying the prescribed criterion is including the feature quantity ID. In one example, determining whether the prescribed criterion is satisfied is determining whether the determinations in the two examples described above are both satisfied. In this case, satisfying the prescribed criterion is having the prescribed similarity and including the feature quantity ID. The prescribed similarity in step 203 is preferably according to the same criterion as that of the prescribed similarity in a process of step 108 by the server control unit 21.

When it is determined in step 203 that the prescribed criterion is satisfied, processing of the flowchart proceeds to step 204, and when it is determined in step 203 that the prescribed criterion is not satisfied, the processing of the flowchart proceeds to step 206.

In step 204, the determination device control unit 41 performs a prescribed calculation based on the ticket ID and the feature quantity ID obtained in step 201 and the event ID stored in the determination device storage unit 42, thereby calculating check data. The determination device control unit 41 determines whether the calculated check data matches the check data obtained in step 201. The prescribed calculation is the same process as the calculation performed when the server control unit 21 calculates the check data in step 109. In the present embodiment, the determination device storage unit 42 stores the same check-data calculation program as the check data calculation program stored in the storage device 14. The prescribed calculation is implemented by the check data calculation program stored in the determination device storage unit 42, and the determination device control unit 41 calculates the check data using the check data calculation program. The above holds true for the other embodiments.

When it is determined in step 204 that the check data is matched, the processing of the flowchart proceeds to step 205, and when it is determined in step 204 that the check data is not matched, the processing of the flowchart proceeds to step 206. In step 205, the determination device control unit 41 determines that a combination of the presented ticket and the user who uses the ticket is a correct combination and determines the use is an authorized use. In step 206, the determination device control unit 41 determines that the combination of the presented ticket and the user who uses the ticket is an incorrect combination and determines the use is an unauthorized use. In one example, a gate system is placed at an admission gate of an event venue, and the determination device control unit 41 is configured to transmit, to the gate system, a signal of opening a gate or causing the gate to remain open when determining the user is an authorized user. The determination device control unit 41 is configured to transmit, to the gate system, a signal of closing the gate or causing the gate to remain closed when determining the user is an unauthorized user. The determination device control unit 41 may be configured to output an alarm when determining the user is an unauthorized user.

In the flowchart, the order of steps 203 and 204 may be reversed.

Next, actions and effects of the information processing server 1, the determination device 2, and the information processing system 10 in the first embodiment of the present invention will be described.

In the present embodiment, the information processing server 1 stores the feature quantity table 26 that includes feature quantity IDs and items of face feature quantity data associated with the feature quantity IDs. The information processing server 1 determines an item of face feature quantity data from a face image of a user who is to use a ticket, and stores a feature quantity ID associated with an item of face feature quantity data that has the prescribed similarity to the determined item of face feature quantity data. The information processing server 1 stores the same event ID as an event ID stored in the determination device 2. The information processing server 1 performs the prescribed calculation for a ticket for which an application for a purchase has been accepted, based on a determined or obtained ticket ID, the determined feature quantity ID, and the stored event ID, thereby calculating check data. The information processing server 1 generates a code based on the calculated check data, the determined ticket ID, and the determined feature quantity ID and generates ticket data for outputting a ticket to which the generated code is attached. In the present embodiment, with such a configuration, the information processing server 1 can create ticket data for generating a ticket with which a usage validity is determined by the determination device 2, in the information processing system 10.

Before determining a usage validity of a ticket, the determination device 2 stores the feature quantity table 46 and an event ID of an intended event and stores a face feature quantity extraction program and a check data calculation program that are the same as those stored in the information processing server 1. The determination device 2 obtains a ticket ID, a feature quantity ID, and check data from a code attached to the ticket and obtains a face image of a user. From the obtained face image, the determination device 2 determines an item of face feature quantity data using the face feature quantity extraction program. The determination device 2 determines, using the feature quantity table 46, whether the determined face feature quantity and the feature quantity ID obtained from the code satisfy the prescribed criterion. Based on the obtained ticket ID and feature quantity ID, and the event ID stored in advance, the determination device 2 calculates check data using the check data calculation program and determines whether the calculated check data matches the obtained check data. In the present embodiment, with such a configuration, the determination device 2 can determine a usage validity of a ticket generated by the information processing server 1, in the information processing system 10.

As described above, the information processing server 1 does not store a piece of biological information (face image) on a user who is to use a ticket but stores a piece of information (feature quantity ID) concerning a piece of biological information that is similar to the piece of biological information on the user. The ticket stores (retains) the feature quantity ID via the code but does not store the piece of biological information on the user who is to use the ticket. The determination device 2 stores neither the piece of biological information on the user who is to use the ticket nor the feature quantity ID. As seen from the above, in the present embodiment, the configuration in which the ticket, the information processing server 1, and the determination device 2 do not retain the piece of biological information on the user enables a reduction in the risk about the piece of biological information (personal information) on the user who is to use the ticket, for example, the risk of leakage of the piece of biological information.

At the same time, the configuration in which the determination device 2 determines whether the prescribed criterion is satisfied enables whether a user who presents a ticket is an authorized user of the ticket to be determined with a certain accuracy. The feature quantity ID obtained from the code attached to the ticket is not linked directly to the face image of the user who is to use the ticket but linked via the feature quantity table 26 to an item of face feature quantity data having the prescribed similarity to a face image for which an input is received in advance from the user. It therefore can be said that the feature quantity ID linked to the ticket is a feature quantity ID linked to a face image that is similar to the face image of the user. In the present embodiment, the configuration that performs such determination enables detection of an unauthorized use of a ticket with a certain accuracy based on biological information, thus enabling prevention of resale.

For example, in a case where the feature quantity table 26 stores 10000 items of face feature quantity data, one of the 10000 items of face feature quantity data is assigned to a face image of a user who is to use a ticket. The accuracy of the determination of whether a user who presents a ticket is an authorized user of the ticket depends on the number of items of face feature quantity data stored in the feature quantity table 26. For example, the more the number of the items of face feature quantity data stored in the feature quantity table 26, the higher the accuracy of the determination.

Further, in the present embodiment, an event ID is stored only in the information processing server 1 and the determination device 2, and a ticket does not store (retain) the event ID. It is difficult to determine a value of an event ID from check data stored in a ticket, via a code. It is therefore difficult to counterfeit a code attached to a ticket. In the present embodiment, such a configuration enables prevention of counterfeiting a ticket.

Further, in the present embodiment, the determination device 2 can be brought completely off-line. In conventional practices, while communicating with another device, a determination device determines a combination of a ticket and a user to determine whether a visitor at an event venue is an authorized holder of the ticket. However, in some cases, an event venue where a determination device is placed is in an unsatisfactory communication environment, where the determination device does not operate normally. In the present embodiment, the determination device 2 stores the feature quantity table 46, an event ID of an intended event, the face feature quantity extraction program, and the check data calculation program but does not store feature quantity IDs that are determined based on pieces of biological information (face images) on users. As a result, even in a case where a user who is to use a ticket transfers the ticket immediately before the ticket is used, the information processing server 1 is only has to update a piece of biological information (a face image) of a user who is to use the ticket and generate a new item of ticket data, and there is no required processing for the determination device 2. Such a configuration enables the determination by the determination device 2 to be implemented even in a case of an unsatisfactory communication environment of a location where the determination device 2 is placed, for example, an off-line environment.

Further, in the present embodiment, a user who is to use a ticket can use the ticket in the form of an electronic ticket by causing a terminal of the user (client terminal 3) to display the ticket on its screen, or the user can use the ticket in the form of a paper ticket by printing the ticket. In the present embodiment, such a configuration enables the use of a paper ticket even in a case where a user does not bring a terminal such as a smartphone or a case where a malfunction occurs in a terminal, thus allowing usage among a wide variety of users.

Further, in the present embodiment, a code attached to a ticket includes a feature quantity ID, which is identification information, rather than face feature quantity data, which contains a relatively large amount of information. Such a configuration enables an amount of information that the determination device 2 obtains from a code to be reduced more, thus enabling smoother processing.

The actions and effects described above hold true for other embodiments and other examples unless otherwise stated.

Second Embodiment

[Information Processing Server]

Next, the information processing server 1 and the determination device 2 in a second embodiment of the present invention will be described. Differences from the first embodiment will be mainly described below.

In the second embodiment, feature quantity IDs are not used. Instead of feature quantity IDs, the ticket table 27 stores items of face feature quantity data in association with ticket IDs. The feature quantity table 26 and the feature quantity table 46 stores the same face feature quantity data as that in the first embodiment and need not include feature quantity IDs. In a case where feature quantity IDs are not included, the face feature quantity data need not be stored in the form of the feature quantity tables 26 and 46.

FIG. 12 is a flowchart illustrating operation of the information processing server 1 in the second embodiment of the present invention.

Step 301 to step 307 are the same processes as steps 101 to 107 in the first embodiment. In step 308, the server control unit 21 compares the item of face feature quantity data determined in step 307 with the face feature quantity data stored in the feature quantity table 26 to determine an item of face feature quantity data that has a prescribed similarity in the face feature quantity data stored in the feature quantity table 26. The determination of the item of face feature quantity data in step 308 is the same process as the determination of the item of face feature quantity data in step 108 in the first embodiment. The server control unit 21 stores the determined item of face feature quantity data in the ticket table 27 in association with a ticket ID.

In step 309, the server control unit 21 calculates check data by performing a prescribed calculation based on the ticket ID determined in step 304, the item of face feature quantity data determined in step 308, and the event ID determined in step 304. Based on the ticket ID determined in step 304, the item of face feature quantity data determined in step 308, and the calculated check data, the server control unit 21 generates a code to be attached to a ticket. The server control unit 21 generates ticket data for outputting the ticket to which the generated code is attached.

The prescribed calculation in the second embodiment is the same as the prescribed calculation in the first embodiment except that an item of face feature quantity data is used instead of a feature quantity ID in the first embodiment. Note that an item of feature quantity data has a large amount of information compared with a feature quantity ID, and therefore, instead of the item of the face feature quantity data, a predetermined data portion of the item of face feature quantity data may be used.

[Determination Device]

Next, the determination device 2 in the second embodiment of the present invention will be described. Differences from the first embodiment will be mainly described below. Operation of the determination device 2 in the second embodiment is the same as that illustrated in the flowchart illustrated in FIG. 11, but the following processes are different from those in the first embodiment.

In step 201, the determination device control unit 41 brings the image capturing device 34 into operation, capturing an image of a ticket and a user who is presenting the ticket, obtaining a face image of the user, and obtaining a ticket ID, an item of face feature quantity data, and check data from a code attached to the ticket.

In step 203, the determination device control unit 41 determines whether the item of face feature quantity data obtained in step 201 and an item of face feature quantity data determined in step 202 have a prescribed similarity. The prescribed similarity is preferably according to the same criterion as that of the prescribed similarity in a process of step 308 by the server control unit 21.

In step 204, the determination device control unit 41 performs a prescribed calculation based on the ticket ID and the item of face feature quantity data obtained in step 201 and an event ID stored in the determination device storage unit 42, thereby calculating check data. The determination device control unit 41 determines whether the calculated check data matches the check data obtained in step 201. The prescribed calculation is the same process as the calculation performed when the server control unit 21 calculates the check data.

In the second embodiment, a code attached to a ticket includes an item of face feature quantity data, which has a larger amount of information than a code in the first embodiment, and thus it is difficult to perform smoother processing. However, in other respects, the second embodiment can provide the same actions and effects as those of the first embodiment.

Third Embodiment

[Information Processing Server]

Next, the information processing server 1 in a third embodiment of the present invention will be described. Differences from the first embodiment will be mainly described below. The determination device 2 in the third embodiment is the same as the determination device 2 in the first embodiment. First, a first example of the third embodiment will be described.

The server storage unit 22 further stores a user table 28 (not illustrated). The user table 28 includes, as data items, a user ID and related user identification information, which is user identification information for another system. A primary key of the user table 28 is the user ID, which is an exemplification of user identification information that can identify a user. In embodiments of the present invention, the server storage unit 22 may or need not store the ticket book table 25, which will be described in modifications. For convenience of description, the server storage unit 22 is supposed not to store the ticket book table 25 in the third embodiment. In this case, an event ID is stored in the ticket table 27 in association with a ticket ID.

The ticket selling server 4 further includes a member database. The member database is a database that stores member information on members of a ticket selling website. A piece of the member information includes a member ID, a password, a name, and a contact address such as an email address. The member ID is a unique piece of identification information for identifying a member who registers himself or herself as a user on the ticket selling website. The password is a password that is used for authentication of the member. For authentication of a member, a member ID and a password in the member information are used. Operating the client terminal 3, a user can perform a member registration, login, logout, and the like on ticket selling website. When the ticket selling server 4 accepts a member registration from a user, the ticket selling server 4 receives an input of a piece of member information, generates the piece of member information of the user, and stores the piece of member information in the member database. To purchase a ticket, a user is required to perform a member registration before a login. In the first example, a piece of related user identification information is a member ID. The ticket selling server 4 receives an input of a face image from a user who has performed a member registration and stores the face image in the member database in association with a member ID.

The server control unit 21 has a function of creating a ticket management web page that has a relation with a ticket selling website. The ticket management web page has a relation with the ticket selling website in association with a user ID or a piece of related user identification information (member ID) and displays a web page for each user ID. That is, for each user who performs a login, the ticket management web page displays a web page corresponding to a user ID of the user. In one example, the ticket selling website in a logged-in state generates a link for accessing the ticket management web page, and when accessed from the ticket selling website via the link, the server control unit 21 displays the ticket management web page in a state where the ticket management web page is logged in with the user ID. The ticket selling website in the logged-in state may display, to a user who has purchased a ticket, a necessity to input a face image for making the ticket available. The information processing server 1 is configured to transmit ticket data to the client terminal 3 via a ticket management web page.

FIG. 13 is a flowchart illustrating operation of the information processing server 1 in the third embodiment of the present invention. Along the flowchart, operation of information processing system 10 including operation of the server control unit 21 and the server storage unit 22 will be described.

Steps 401 to 403 and 406 to 408 are the same processes as steps 101 to 103 and 107 to 109 in the first embodiment, respectively. Note that, in step 403, the piece of user information included in the piece of order information transmitted by the ticket selling server 4 to the information processing server 1 includes a member ID.

In step 404, the server control unit 21 determines a ticket ID for the ticket for which the application for the purchase has been accepted. The server control unit 21 determines an event ID that corresponds to a piece of event information included in the received piece of ticket information and stores the event ID in the ticket table 27 in association with the ticket ID. The server control unit 21 determines a user ID to be associated with the ticket ID and stores the member ID in the received piece of user information in the user table 28 in association with the user ID. When the member ID has already been stored in the user table 28, the user ID determined by the server control unit 21 is a user ID that is associated with the member ID in the user table 28.

In step 405, the server control unit 21 obtains a face image associated with the member ID from the ticket selling server 4. After determining the feature quantity ID in step 407, the server control unit 21 stores the feature quantity ID in the user table 28 in association with the user ID. In addition to or instead of storing the feature quantity ID in the user table 28, the server control unit 21 may store the feature quantity ID in the ticket table 27 in association with the ticket ID.

In a case where the ticket selling server 4 does not store the face image or cannot obtain the face image in step 405, the server control unit 21 displays a screen that asks the user to input a face image in the ticket management web page. Via the ticket management web page, the server control unit 21 receives an input of a face image from the user.

With the configuration in the present embodiment, the server control unit 21 can display a ticket management web page that is linked to a user ID or a member ID and can link the user ID to an item of face feature quantity data determined from a face image of a user for whom an input has already received. This dispenses with the need to input a new face image when the user purchases a ticket on the same ticket selling website next time, thus enabling promotion of use by a wide variety of users. This holds true for a second example.

Next, a second example of the third embodiment will be described. Differences from the first example will be mainly described below. In the second example, the information processing server 1 and the ticket selling server 4 have a function of social login, which enables a login to be performed with an account of a social networking service (SNS). To purchase a ticket, a user is required to perform a login using his or her account of an SNS. Related user identification information in the second example is an account ID of an SNS such as an email address.

In step 403, the piece of user information included in the piece of order information transmitted by the ticket selling server 4 to the information processing server 1 includes an account ID of an SNS. In step 404, what the server control unit 21 stores in the user table 28 in association with the user ID is the account ID of the SNS. In step 405, a face image obtained by the server control unit 21 is a face image that is associated with the account ID of the SNS from a web page of the SNS, such as a profile picture.

Fourth Embodiment

[Information Processing Server]

Next, the information processing server 1 in a fourth embodiment of the present invention will be described. Differences from the third embodiment will be mainly described below. The determination device 2 in the fourth embodiment is the same as the determination device 2 in the second embodiment.

In the fourth embodiment, feature quantity IDs are not used. Instead of feature quantity IDs, the ticket table 27 stores items of face feature quantity data in association with ticket IDs. The feature quantity table 26 and the feature quantity table 46 stores the same face feature quantity data as that in the first embodiment and need not include feature quantity IDs. In a case where feature quantity IDs are not included, the face feature quantity data need not be stored in the form of the feature quantity tables 26 and 46.

FIG. 14 is a flowchart illustrating operation of the information processing server 1 in the fourth embodiment of the present invention. Along the flowchart, operation of information processing system 10 including operation of the server control unit 21 and the server storage unit 22 will be described.

Step 501 to step 506 are the same processes as 401 to 406 in the third embodiment, and step 507 to step 508 are the same processes as 308 to 309 in the second embodiment.

Another embodiment of the present invention can be a program that implements the functions or the information processing illustrated in the flowcharts in the embodiments of the present invention described above or can be a computer-readable storage medium that stores the program. Still another embodiment of the present invention can be a method that implements the functions or the information processing illustrated in the flowcharts in the embodiments of the present invention described above. Still another embodiment of the present invention can be a server capable of supplying a computer with a program that implements the functions or the information processing illustrated in the flowcharts in the embodiments of the present invention described above. Still another embodiment of the present invention can be a virtual machine that implements the functions or the information processing illustrated in the flowcharts in the embodiments of the present invention described above. For example, in the other embodiments of the present invention, the information processing server 1 is implemented in the form of a cloud (cloud server).

In the embodiments of the present invention, the information processing server 1 is supposed to execute prescribed processing for a ticket for which an application of a purchase has been accepted and generate ticket data, but an application for a purchase of a ticket in the embodiments of the present invention can be an application for issuing a ticket that is obtained not by purchasing it.

In the embodiments of the present invention, the face feature quantity data is an exemplification of feature quantity data that can be obtained from biological information. For example, the feature quantity data that can be obtained from biological information can be palm print data or voiceprint data.

Hereinafter, modifications of the embodiments of the present invention will be described. Differences from the embodiments of the present invention will be mainly described below. The modifications to be described below can be applied to any embodiments or modifications of the present invention in combination as appropriate unless inconsistency arises.

First Modification

In one modification of the embodiments of the present invention, the feature quantity table 26 does not store face feature quantity data, and the feature quantity table 26 includes feature quantity IDs and items of voice feature quantity data that can be obtained based on voice, and the items of voice feature quantity data are stored in association with the feature quantity IDs. The voice feature quantity data is feature quantity data that is extracted or obtained from data on voice by a known voice feature quantity extraction method, for example, a known voice feature quantity extraction program. For example, the voice feature quantity data stored in the feature quantity table 26 is voice feature quantity data obtained from voices of unreal persons or unspecified real persons, and the voice feature quantity data is obtained by means of the voice feature quantity extraction program described above. The feature quantity table 26 is not supposed to store an item of voice feature quantity data that corresponds to an item of data on a voice of a user who is to use a ticket.

Regarding the present modification, a modification of the first embodiment will be described below. Differences from the first embodiment will be mainly described below. The determination device 2 and the client terminal 3 each include a voice input device such as a microphone.

In step 106, via a ticket management web page displaying a screen that asks the user to input a voice, the client terminal 3 receives an input of the voice from the user and transmits the voice to the information processing server 1. In step 107, the server control unit 21 determines an item of voice feature quantity data from data on the received voice using the voice feature quantity extraction program stored in the server storage unit 22. In step 201, the determination device control unit 41 brings the image capturing device 34 into operation, capturing an image of a ticket, and obtaining a ticket ID, a feature quantity ID, and check data from a code attached to the ticket. Further, in step 201, the determination device control unit 41 brings the voice input device into operation, obtaining data on a voice of a user who is using the ticket. In step 202, the determination device control unit 41 determines an item of voice feature quantity data from the obtained data on the voice of the user using the same voice feature quantity extraction program as the voice feature quantity extraction program stored in the server storage unit 22. The above holds true for the other modifications of the embodiments.

Second Modification

In one modification of the embodiments of the present invention, data stored in the feature quantity table 26 is a plurality of items of face feature quantity data that are calculated by a prescribed calculation program. In this case, the face feature quantity data stored in the feature quantity table 26 is not face feature quantity data obtained from face images of unreal persons or unspecified real persons. The above holds true for a case where the feature quantity table 26 stores biological information other than face feature quantity data. For example, in the present modification, voiceprint data stored in the feature quantity table 26 is a plurality of items of voiceprint data that are calculated by a prescribed calculation program.

Third Modification

In one modification of the embodiments of the present invention, the determination device 2 further includes a code reading device (not illustrated) for reading a code attached to a ticket. For example, the determination device 2 includes a main part that has main functions of the determination device 2 and a code reading device that is connected to the main part so as to be capable of communicating with the main part. In the present modification, in step 201, the determination device control unit 41 brings the image capturing device 34 into operation, obtaining a face image of the user and brings the code reading device into operation, obtaining a ticket ID, a feature quantity ID or an item of face feature quantity data, and check data from a code attached to the ticket.

Fourth Modification

In one modification of the embodiments of the present invention, the information processing server 1 has a function of the ticket selling server 4 and provides the client terminal 3 with a service for purchasing a ticket via a ticket selling website. In the present embodiment, the processing by the information processing server 1 and the ticket selling server 4 described from the first embodiment to the fourth embodiment is processing by the information processing server 1.

Fifth Modification

In one modification of the embodiments of the present invention, in a case where a ticket is a coupon, a location where the determination device 2 is placed is a store or the like rather than an event venue.

Sixth Modification

In one modification of the embodiments of the present invention, the server control unit 21 obtains a ticket ID that is assigned in advance to a ticket for which an application for a purchase has been accepted, instead of determining the ticket ID. For example, the ticket selling server 4 determines the ticket ID. Regarding the present modification, a modification of the first embodiment will be described below.

In step 103, the piece of order information transmitted by the ticket selling server 4 to the information processing server 1 includes a ticket ID determined by the ticket selling server 4. In step 104, the server control unit 21 obtains the ticket ID from the received piece of order information. In step 109, the server control unit 21 calculates check data by performing the prescribed calculation based on the ticket ID obtained in step 104, the feature quantity ID determined in step 108, and the event ID determined in step 104. Then, based on the ticket ID obtained in step 104, the feature quantity ID determined in step 108, and the calculated check data, the server control unit 21 generates a code to be attached to a ticket. The above holds true for the other modifications of the embodiments.

Seventh Modification

In one modification of the first embodiment and the second embodiment of the present invention, in step 103, for each accepted piece of order information, the ticket selling server 4 transmits a piece of ticket information or the piece of order information to the information processing server 1. In step 104, a ticket ID is assigned to a ticket that is specified from the received piece of ticket information or order information. In step 105, the server control unit 21 transmits an address (URL) of a ticket management web page linked to the assigned ticket ID to the ticket selling server 4. The ticket selling server 4 transmits the address (URL) of the ticket management web page linked to the ticket ID to an email address of a user. In the present modification, the server control unit 21 and the ticket selling server 4 execute the above processes instead of steps 104 to 105 in the first embodiment and the second embodiment. The server control unit 21 does not transmit the information to the email address of the user, and thus the information processing server 1 need not receive the piece of user information in step 103.

Eighth Modification

In one modification of the first embodiment and the second embodiment of the present invention, the ticket selling server 4 further includes a member database. The member database is the same as that described in the third embodiment, and a piece of member information includes an email address. The email address can be substituted with a telephone number, an ID of an SNS or a chat tool, or the like. In the present modification, a piece of user information included in a piece of order information is a piece of information included in a piece of member information such as an email address.

Ninth Modification

In one modification of the first embodiment and the second embodiment of the present invention, the ticket selling server 4 further includes a member database. The member database is the same as that described in the third embodiment. The server control unit 21 has a function of creating a ticket management web page that has a relation with a ticket selling website. Regarding the present modification, a modification of the first embodiment will be described below.

In the present modification, in step 105, the server control unit 21 need not transmit an address of a ticket management web page linked to a ticket ID to an email address of a user included in a received piece of order information. A ticket selling website in the logged-in state displays, to a user who has purchased a ticket, a necessity to input a face image for making the ticket available and generates a link for accessing the ticket management web page. By access from the ticket selling website via the link, the server control unit 21 displays the ticket management web page, thus becoming ready to receive an input of a face image from the user via the client terminal 3. In one example, the server control unit 21 can display a ticket management web page linked to a member ID in response to access from a ticket selling website in the logged-in state and can link the page to a face image of the user for whom an input has already received. This dispenses with the need to input a new face image when the user purchases a ticket on the same ticket selling website next time, thus enabling promotion of use by a wide variety of users.

Tenth Modification

In one modification of the third embodiment and the fourth embodiment of the present invention, a dedicated application that can communicate with the ticket selling server 4 and the information processing server 1 and provide the same services as those provided by a ticket selling website and a ticket management web page (hereinafter, referred to as "dedicated app") is installed on the client terminal 3. In a preferred example of the present modification, the client terminal 3 is a smartphone. The dedicated app is linked to at least one of a member ID stored in the ticket selling server 4 and a user ID stored in the information processing server 1. Regarding the present modification, a modification of the third embodiment will be described below.

In step 401, the client terminal 3 receives an input of an application for a purchase of a ticket via the dedicated app. Via the dedicated app, the client terminal 3 transmits a piece of order information including a piece of user information and a piece of ticket information concerning the ticket for which the application for the purchase has been accepted, to the ticket selling server 4. The piece of user information in this case is only required to include the ID linked to the dedicated app. In a case where the ticket selling server 4 does not store the face image or cannot obtain the face image in step 405, the server control unit 21 causes, via the dedicated app, the client terminal 3 to display a screen that asks the user to input a face image. Via the dedicated app, the server control unit 21 receives an input of a face image from the user.

In the present modification, the information processing server 1 transmits the ticket data generated in step 408 to the client terminal 3 via the dedicated app, and the client terminal 3 obtains the ticket data. For example, after generating the ticket data in step 408, the server control unit 21 can accept a change of the user who is to use the ticket, via the dedicated app.

In the present modification, the dedicated app may include a face feature quantity extraction program and may be configured to determine an item of face feature quantity data from a face image. For example, in a case where the ticket selling server 4 does not store the face image or cannot obtain the face image in step 405, the server control unit 21 causes, via the dedicated app, the client terminal 3 to display a screen that asks the user to input a face image. Receiving an input of the face image, the dedicated app determines an item of face feature quantity data from the face image and transmits the determined item of face feature quantity data to the information processing server 1. In this case, the server control unit 21 need not execute a process of step 406. The above holds true for modifications of the fourth embodiment.

Eleventh Modification

In one modification of the third embodiment and the fourth embodiment of the present invention, a ticket management web page is configured to be directly accessed by inputting a user ID and a password not via a ticket selling website.

Twelfth Modification

In one modification of the embodiments of the present invention, a piece of user information included in a piece of order information is an ID or a code that can identify the client terminal 3, such as an IP address and a MAC address.

Thirteenth Modification

In one modification of the embodiments of the present invention, the server storage unit 22 includes neither the ticket book table 25 nor the ticket book ID. In the present modification, the ticket table 27 includes, as data items, a ticket ID, an event ID, ticket detail information, and a feature quantity ID, and a ticket ID and an event ID are associated with each other via the ticket table 27. In the present modification, for example, in step 104 in the first embodiment, the server control unit 21 does not determine the ticket book ID. The server control unit 21 determines an event ID that corresponds to a piece of event information included in the received piece of ticket information and stores the event ID in the ticket table 27 in association with the ticket ID. The above holds true for the other embodiments.

Fourteenth Modification

In one modification of the embodiments of the present invention, the server storage unit 22 need not store the event table 24 and stores prescribed data that is not limited to event IDs. The prescribed data can be data for identifying an event or can be data for identifying a system administrator. For example, an item of prescribed data is stored in the ticket table 27 in association with the ticket ID. For example, the prescribed data is numerical data. In the present modification, the same prescribed data as prescribed data stored in the server storage unit 22 is stored in the determination device 2. For example, regarding an intended ticket, the same item of prescribed data as an item of prescribed data stored in the server storage unit 22 in association with a ticket ID of the ticket is stored in the determination device 2, which determines a usage validity of the ticket. As described in the embodiments of the present invention, although it is desirable that the same event ID is stored in the information processing server 1 and the determination device 2, the embodiments of the present invention may be implemented by the information processing server 1 and the determination device 2 storing the same item of prescribed data as in the present modification.

Fifteenth Modification

In one modification of the first embodiment of the present invention, the prescribed calculation by the server control unit 21 in step 109 is performed based on the event ID determined in step 104 and at least one of the ticket ID determined in step 104 and the feature quantity ID determined in step 108. In this case, the prescribed calculation by the determination device 2 in step 204 is also performed based on the event ID stored in the determination device storage unit 42 and at least one of the ticket ID and the feature quantity ID obtained in step 201. As described in the embodiments of the present invention, although it is desirable from the viewpoint of robustness that the prescribed calculation is performed using a ticket ID, a feature quantity ID, and an event ID, the embodiments of the present invention may be implemented even in a case where any one of a ticket ID and a feature quantity ID is not used. The above holds true for the third embodiment.

Sixteenth Modification

In the same manner as described above, in a modification of the second embodiment of the present invention, in step 309, the server control unit 21 calculates check data by performing the prescribed calculation based on the event ID determined in step 304 and at least one of the ticket ID determined in step 304 and the item of face feature quantity data determined in step 308. In this case, the prescribed calculation by the determination device 2 in step 204 is also performed based on the event ID stored in the determination device storage unit 42 and at least one of the ticket ID and the item of face feature quantity data obtained in step 201. The above holds true for the fourth embodiment.

Seventeenth Modification

In one modification of the embodiments of the present invention, the server control unit 21 determines a plurality of items of face feature quantity data rather than determining one of items of the face feature quantity data stored in the feature quantity table 26. For example, in step 108, the server control unit 21 determines a plurality of items of face feature quantity data that have a prescribed similarity in the face feature quantity data stored in the feature quantity table 26. In this case, in step 109, the server control unit 21 uses a plurality of feature quantity IDs. The above holds true for the other embodiments.

Eighteenth Modification

In one modification of the embodiments of the present invention, feature quantity data stored in the feature quantity table 26 is processed feature quantity data that is generated based on face feature quantity data. In one example, the processed feature quantity data is data that is obtained by performing a prescribed encryption processing on face feature quantity data that is feature quantity data extracted or obtained from face images using the face feature quantity extraction program stored in the server storage unit 22. The face feature quantity data is obtained by performing the prescribed decryption processing on the processed feature quantity data. The server storage unit 22 and the determination device storage unit 42 stores an encryption program that performs the prescribed encryption processing and a decryption program that performs the prescribed decryption processing. The prescribed encryption processing can be processing other than encryption processing. In this case, the prescribed decryption processing can be processing that restores processed data.

Regarding the present modification, a modification of the first embodiment will be described below. In step 108, the server control unit 21 compares the item of face feature quantity data determined in step 107 with the face feature quantity data from which the processed feature quantity data stored in the feature quantity table 26 is derived, to determine an item of processed feature quantity data that is generated based on an item of face feature quantity data having a prescribed similarity in the face feature quantity data based on which the processed feature quantity data stored in the feature quantity table 26 is derived. When performing a process of the comparison, the server control unit 21 decrypts the processed feature quantity data to obtain the face feature quantity data. When determining the item of processed feature quantity data, the server control unit 21 determines an item of face feature quantity data and determines the item of processed feature quantity data by encrypting the determined item of face feature quantity data. The determined item of processed feature quantity data is one stored in the feature quantity table 26. In the present modification, in such a configuration, the feature quantity table 26 does not store the face feature quantity data as it is, and thus the risk about biological information on a user who is to use a ticket can be further reduced. In step 203, the determination device control unit 41 decrypts an item of processed feature quantity data that is associated with the feature quantity ID in the feature quantity table 46 and determines whether the feature quantity ID obtained in step 201 and the item of face feature quantity data determined in step 202 satisfy the prescribed criterion. The above holds true for the third embodiment.

In the same manner as described above, regarding the present modification, a modification of the second embodiment will be described below. In step 308, the server control unit 21 compares the item of face feature quantity data determined in step 307 with the face feature quantity data from which the processed feature quantity data stored in the feature quantity table 26 is derived, to determine an item of processed feature quantity data that is generated based on an item of face feature quantity data having a prescribed similarity in the face feature quantity data based on which the processed feature quantity data stored in the feature quantity table 26 is derived. In step 309, the server control unit 21 calculates check data by performing the prescribed calculation based on the ticket ID determined in step 304, the item of processed feature quantity data determined in step 308, and the event ID determined in step 304. Based on the ticket ID determined in step 304, the item of processed feature quantity data determined in step 308, and the calculated check data, the server control unit 21 generates the code to be attached to the ticket. In step 203, the determination device control unit 41 determines whether the item of face feature quantity data that is obtained in step 201 and from which an item of processed feature quantity data is derived and the item of face feature quantity data determined in step 202 have the prescribed similarity.

Nineteenth Modification

In one modification of the embodiments of the present invention, face feature quantity data is stored in the form of a data structure or a data format that is different from that illustrated in FIG. 6. In another modification, an item of face feature quantity data is an item of data indicating a piece of numerical value information in the form of a vector having dimensions that are different in number from those of a 128-dimensional vector. For example, the item of face feature quantity data is an item of data indicating a piece of numerical value information in the form of a 256-dimensional vector. The face feature quantity data is not limited to these types of face feature quantity data as long as the face feature quantity data is data that is obtained using a known face feature quantity extraction program. Further, for the calculation of a similarity performed by the server control unit 21, a value corresponding to a Euclidean distance between two items of face feature quantity data can be used, or another known method can be used.

Twentieth Modification

In one modification of the embodiments of the present invention, the determination device storage unit 42 further includes a used ticket table for determining whether a presented ticket is unused. The used ticket table includes, as a data table, a ticket ID and status information that indicates any one of an unused state and a used state, and its primary key is the ticket ID. In the flowchart illustrated in FIG. 11, the determination device control unit 41 determines whether a ticket ID obtained from the code obtained in step 201 is used, before step 203 for example. When the ticket ID is unused, a piece of status information associated with the ticket ID in the ticket post-consumer table is updated to the used state, and the flowchart proceeds to step 203. When the ticket ID is used, the flowchart proceeds to step 206. A process of the determination of whether the ticket ID is used may be executed any time from step 202 to step 205.

Twenty-First Modification

In one modification of the embodiments of the present invention, the server control unit 21 is configured such that the server control unit 21 generates a code by writing data into an RF tag. Regarding the present modification, a modification of the first embodiment will be described below. In step 109, the server control unit 21 writes items of data corresponding to a ticket ID, a feature quantity ID, and check data into an RF tag. For example, by mail or the like, a user who is to use a ticket can obtain an RF tag into which data is written. The RF tag can be another type of noncontact IC card. The above holds true for the other modifications of the embodiments.

The processing or operation described above can be modified freely unless any inconsistency occurs in processing or operation occurs in a step, such as use of data that should not be available yet in the step. Further, the embodiments described above are exemplifications for describing the present invention and shall not be construed as limiting the present invention. The present invention can be carried out in various forms without departing from the gist of the present invention.

REFERENCE SIGNS LIST

1 information processing server
2 determination device
3 client terminal
4 ticket selling server
5, 6 network 10 information processing system
11, 31, 51, 52 processor
12, 32, 52, 62 input device
13, 33, 53, 63 display device
14, 35, 54, 64 storage device
15, 36, 55, 65 communication device
16, 37, 56, 66 bus
21 server control unit
22 server storage unit
24 event table
25 ticket book table
26, 46 feature quantity table
27 ticket table
28 user table
34 image capturing device
41 determination device control unit
42 determination device storage unit
71 event information
72 QR Code®

The invention claimed is:

1. An information processing server for managing a ticket, the information processing server comprising:
   a server storage that stores feature quantity data created in advance, the feature quantity data being feature quantity data that is obtainable from biological information, feature quantity identification information that can identify feature quantity data associated with the feature quantity data created in advance, and prescribed data that is identical to prescribed data stored in a determination device for determining a usage validity of a ticket, wherein the items of feature quantity data are each an item of feature quantity data obtained from a piece of biological information on an unreal person and an unspecified real person; and
   processing circuitry configured to:
      determine a piece of ticket identification information that can identify a ticket for which an application for an issuance is accepted or obtain a piece of ticket identification information that is assigned in advance to the ticket,
      determine an item of feature quantity data from a piece of biological information on a user who is to use a ticket that is input,
      compare the determined item of feature quantity data with items of feature quantity data stored in the server storage to determine an item of feature quantity data having a prescribed similarity, and determine a piece of feature quantity identification information that is associated with the item of feature quantity data, and
      calculate check data by performing a prescribed calculation based on the prescribed data, the determined or obtained piece of ticket identification information, and the determined piece of feature quantity identification information,
      generate a code to be attached to the ticket based on the calculated check data, and the determined or obtained piece of ticket identification information, and
      generate ticket data for outputting the ticket to which the generated code is attached.

2. An information processing server for managing a ticket, the information processing server comprising:
   a server storage that stores feature quantity data created in advance, the feature quantity data being feature quantity data that is obtainable from biological information, and prescribed data that is identical to prescribed data stored in a determination device for determining a usage validity of a ticket, wherein the items of feature quantity data are each an item of feature quantity data obtained from a piece of biological information on an unreal person and an unspecified real person; and
   processing circuitry configured to:
      determine a piece of ticket identification information that can identify a ticket for which an application for an issuance is accepted or obtain a piece of ticket identification information that is assigned in advance to the ticket,
      determine an item of feature quantity data from a piece of biological information on a user who is to use a ticket that is input,
      compare the determined item of feature quantity data with items of feature quantity data stored in the server storage to determine an item of feature quantity data having a prescribed similarity, and
      calculate check data by performing a prescribed calculation based on the prescribed data, the determined or obtained piece of ticket identification information, and the determined item of feature quantity data,
      generate a code to be attached to the ticket based on the calculated check data, and the determined or obtained piece of ticket identification information, and
      generate ticket data for outputting the ticket to which the generated code is attached.

3. The information processing server according to claim 1, the processing circuitry further configured to compare the determined item of feature quantity data with the items of feature quantity data stored in the server storage to determine a plurality of items of feature quantity data having the prescribed similarity.

4. The information processing server according to claim 1, wherein the items of feature quantity data stored in the server storage are each an item of face feature quantity data indicating feature quantities corresponding to points, lines, or a surface in face features that are obtainable based on a face image.

5. The information processing server according to claim 1, wherein
   the items of feature quantity data stored in the server storage unit are each an item of processed feature quantity data that is generated based on an item of feature quantity data, and
   the processing circuitry is further configured to compare, instead of comparing the determined item of feature quantity data with the items of feature quantity data stored in the server storage, the determined item of feature quantity data with items of feature quantity data from which items of processed feature quantity data stored in the server storage are derived to determine an item of processed feature quantity data that is generated based on an item of feature quantity data having a prescribed similarity.

6. The information processing server according to claim 1, the processing circuitry further configured to transmit ticket data for outputting a ticket to which the generated code is attached to a client terminal that is capable of communicating with the information processing server via a network.

* * * * *